(12) United States Patent
Lu et al.

(10) Patent No.: US 12,524,078 B2
(45) Date of Patent: Jan. 13, 2026

(54) DEVICES AND METHODS FOR GESTURE-BASED SELECTION

(71) Applicant: Huawei Technologies Co., Ltd., Shenzhen (CN)

(72) Inventors: Juwei Lu, North York (CA); Sayem Mohammad Siam, North York (CA); Deepak Sridhar, San Diego, CA (US); Sidharth Singla, Mississauga (CA); Yannick Verdie, Toronto (CA); Xiaofei Wu, Shenzhen (CN); Srikanth Muralidharan, Thornhill (CA); Zihao Yang, Richmond Hill (CA); Peng Dai, Markham (CA); Songcen Xu, Shenzhen (GD)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 18/345,794

(22) Filed: Jun. 30, 2023

(65) Prior Publication Data

US 2023/0350499 A1 Nov. 2, 2023

Related U.S. Application Data

(63) Continuation of application No. PCT/CN2021/106778, filed on Jul. 16, 2021.

(51) Int. Cl.
| | |
|---|---|
| *G06F 3/01* | (2006.01) |
| *G06T 7/70* | (2017.01) |
| *G06V 20/40* | (2022.01) |
| *G06V 40/10* | (2022.01) |
| *G06V 40/20* | (2022.01) |

(52) U.S. Cl.
CPC ............... *G06F 3/017* (2013.01); *G06T 7/70* (2017.01); *G06V 20/46* (2022.01); *G06V 40/10* (2022.01); *G06V 40/28* (2022.01); *G06T 2207/10016* (2013.01)

(58) Field of Classification Search
CPC ........ G06V 40/28; G06V 20/46; G06V 40/10; G06T 2207/10016; G06T 7/70; G06F 3/017
See application file for complete search history.

(56) References Cited

U.S. PATENT DOCUMENTS

| | | | | |
|---|---|---|---|---|
| 7,519,223 | B2 * | 4/2009 | Dehlin | G06V 40/28 |
| | | | | 345/173 |
| 7,665,041 | B2 * | 2/2010 | Wilson | G06F 3/017 |
| | | | | 715/863 |
| 8,830,312 | B2 * | 9/2014 | Hummel | G06F 3/0304 |
| | | | | 382/103 |
| 8,854,433 | B1 * | 10/2014 | Rafii | G06F 3/011 |
| | | | | 348/42 |
| 10,401,967 | B2 * | 9/2019 | Katz | G06T 7/70 |

(Continued)

*Primary Examiner* — Tadesse Hailu

(57) ABSTRACT

Methods and devices for machine vision-based selection of content are described. One or more hands are detected in a current frame of video data. A respective fingertip location is determined for each of up to two of the detected hands. A content selection gesture is determined corresponding to the up to two detected hands. Selected content is extracted, as indicated by the content selection gesture and based on the up to two fingertip locations. The device may be a smartphone, a tablet, a laptop, a smart light device, a reader device, etc.

20 Claims, 10 Drawing Sheets

(56) References Cited

U.S. PATENT DOCUMENTS

| | | | | |
|---|---|---|---|---|
| 2005/0271279 A1* | 12/2005 | Fujimura | | G06V 40/28 |
| | | | | 382/209 |
| 2010/0259493 A1* | 10/2010 | Chang | | G06F 3/0418 |
| | | | | 345/173 |
| 2012/0242800 A1* | 9/2012 | Ionescu | | G06V 40/107 |
| | | | | 348/46 |
| 2013/0283213 A1* | 10/2013 | Guendelman | | G06F 3/0485 |
| | | | | 715/848 |
| 2013/0343605 A1* | 12/2013 | Dal Mutto | | G06V 40/107 |
| | | | | 382/103 |
| 2014/0145929 A1* | 5/2014 | Minnen | | G06V 40/20 |
| | | | | 345/156 |
| 2014/0168084 A1* | 6/2014 | Burr | | G06V 10/96 |
| | | | | 345/156 |
| 2015/0242096 A1* | 8/2015 | Carro | | G10L 13/00 |
| | | | | 715/277 |
| 2016/0091964 A1* | 3/2016 | Iyer | | G06V 20/20 |
| | | | | 715/863 |
| 2016/0239080 A1* | 8/2016 | Marcolina | | G06F 3/017 |
| 2017/0045952 A1* | 2/2017 | Zhang | | G06F 3/017 |
| 2017/0371403 A1* | 12/2017 | Wetzler | | G06V 40/113 |
| 2018/0047182 A1* | 2/2018 | Gelb | | G06T 19/00 |
| 2018/0088674 A1* | 3/2018 | Chen | | G06F 3/0425 |
| 2018/0120950 A1* | 5/2018 | Karmon | | G06V 40/28 |
| 2020/0117336 A1* | 4/2020 | Mani | | F25B 49/005 |
| 2020/0409469 A1* | 12/2020 | Kannan | | G06N 3/08 |
| 2021/0056408 A1* | 2/2021 | Brandt | | G06N 3/045 |
| 2021/0096652 A1* | 4/2021 | Wang | | G06T 7/73 |
| 2021/0264140 A1* | 8/2021 | Hill | | G06V 40/20 |
| 2021/0271892 A1* | 9/2021 | Luo | | G06V 40/23 |
| 2022/0083197 A1* | 3/2022 | Rockel | | G06T 19/006 |
| 2022/0405502 A1* | 12/2022 | Wang | | G06V 40/103 |

\* cited by examiner

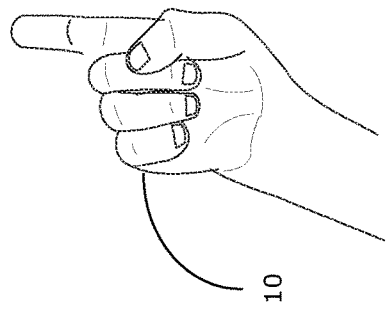
FIG. 3E
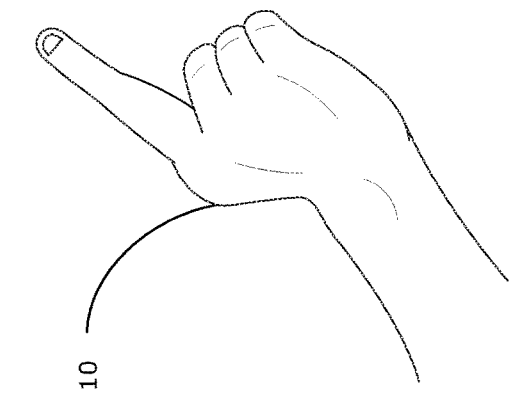
FIG. 3F
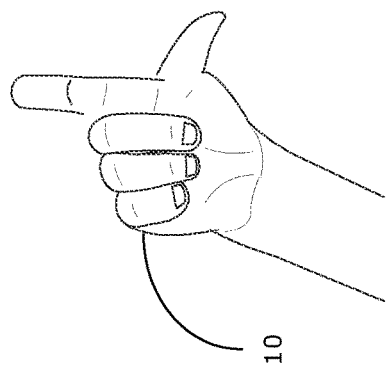
FIG. 3C
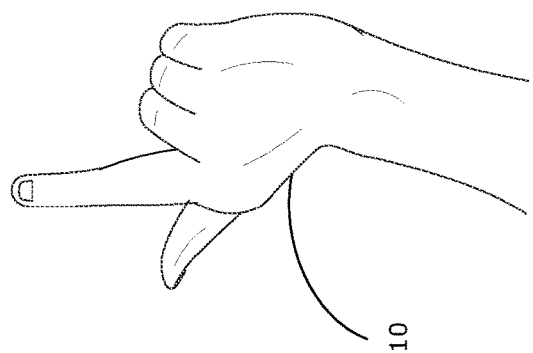
FIG. 3D
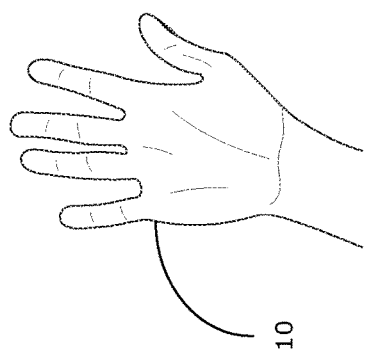
FIG. 3A
FIG. 3B

DEVICES AND METHODS FOR GESTURE-BASED SELECTION

CROSS-REFERENCE TO RELATED APPLICATIONS

The present disclosure is a continuation application of International Application No. PCT/CN2021/106778, entitled "DEVICES AND METHODS FOR GESTURE-BASED SELECTION", filed Jul. 16, 2021, the entirety of which is hereby incorporated by reference.

FIELD

The present disclosure relates to devices and methods for machine vision-based detection and recognition of gestures, including two-handed gestures, for selection of content.

BACKGROUND

Touch gestures are commonly used for selection of digital content (e.g., digital text) that is displayed on a touchscreen of a device (e.g., smartphone, tablet, laptop, etc.). Such touch-based technologies are limited in that a touchscreen is required and only digitally displayed content can be selected.

Technology that enables selection of non-digital visual content (e.g., text of a physical book) using a hand gesture have been recently developed. Such technologies typically use machine vision-based detection of hand gestures and machine-vision based recognition of non-digital content to support selection of text from the non-digital content. However, existing non-touch based technologies are limited in the type of gestures that can be recognized, resulting in user interaction that is less intuitive and/or more error-prone than touch-based interactions. Further, existing machine vision-based technologies for selection of non-digital content may not be able to accurately detect and recognize the content using machine vision if any portion of the content is obscured by the user's hand.

There are also challenges to implementing machine vision-based technologies in some consumer devices (e.g., mobile devices) having limited resources (e.g., limited memory resources, limited processing power, limited battery power, etc.). Many existing machine vision-based technologies require execution of multiple neural networks each having many neural network layers (and thus requiring a large amount of computations), in order to achieve a satisfactory level of accuracy in gesture detection and content recognition. This limits the use of such technologies in practical applications.

Accordingly, it would be useful to provide more accurate and less computationally expensive machine vision-based methods and devices for detection and recognition of gestures for selection of content.

SUMMARY

In various examples, the present disclosure describes devices and methods for machine vision-based detection of hand gestures, including two-handed gestures, for selection of visual content. The detection of two hands and recognition of two-handed gestures enables more accurate user selection of content. For example, the disclosed devices and methods enable user selection of a region of interest or a text paragraph in a non-digital page. The present disclosure also describes examples for detection and recognition of two-handed gestures, using a deep neural network. The present disclosure thus provides a technical solution to the problem of how to accurately detect user selection of visual content, including non-digital visual content.

In some examples, the present disclosure describes devices and methods that enables detection of a content change, for example as indicated by a recognized gesture or detected by analysis of a frame of video data. Content recognition may then be performed, and the recognized content may be stored in a content database, ahead of detecting a content selection gesture. This may help to address the problem that content may be obscured by the content selection gesture. In other examples, instead of performing content recognition ahead of time, content recognition may be performed at the time that the content selection gesture is recognized.

Examples of the present disclosure enable detection of a recognized content selection gesture made by up to two hands. As well, the respective fingertip locations can be detected. Using the detected content selection gesture, recognized content may be extracted, for example from a content database. This may provide a solution for more accurate and intuitive selection of a region of interest or a section of text in a non-digital visual content.

In some examples, the present disclosure also describes devices and methods that enables the use of depth information for detection of hand gestures, for selection of content. The present disclosure thus provides a technical solution to the problem of how to accurately detect a user touch gesture in visual content, using machine vision.

In an example aspect, the present disclosure describes a method for content selection. The method includes: detecting one or more hands in an obtained current frame of video data; determining a respective fingertip location associated with each of up to two detected hands of the detected one or more hands; identifying a content selection gesture corresponding to the up to two detected hands; and extracting selected content indicated by the content selection gesture, wherein indication of the selected content is further based on the respective up to two fingertip locations.

In a preceding example aspect of the method, detecting the respective fingertip location associated with each of the up to two detected hands may include: using hand bounding boxes corresponding to the up to two detected hands, performing hand classification and hand pose detection to determine the respective fingertip location associated with each of the up to two detected hands.

In a preceding example aspect of the method, hand classification and hand pose detection may be performed to also determine a respective gesture label with each of the up to two detected hands, and the content selection gesture may be identified based on the respective up to two gesture labels.

In any of the preceding example aspects of the method, extracting the selected content may include extracting a portion of the current frame of video data indicated by the content selection gesture and performing content recognition in the portion of the current frame of video data.

In any of the preceding example aspects of the method, extracting the selected content may include extracting the selected content from content data stored in a content database.

In a preceding example aspect of the method, the method may also include: for a first frame of video data prior to receiving the current frame of video data: determining there is a content change; obtaining content data recognized from content captured in the first frame of video data; and storing the content data in the content database.

In a preceding example aspect of the method, determining the content change may include: determining a difference between a statistical characteristic of the first frame of video data and another frame of video data captured prior to the first frame, wherein the determined difference is greater than a preset threshold.

In a preceding example aspect of the method, determining the content change may include: detecting a hand in the first frame of video data; and identifying a content change gesture, corresponding to the detected hand in the first frame of video data, indicating the content change.

In a preceding example aspect of the method, identifying the content change gesture may include: using a hand bounding box corresponding to the detected hand in the first frame of video data, performing hand classification to determine a gesture label associated with the detected hand in the first frame of video data. The content change gesture may be identified based on the gesture label associated with the detected hand in the first frame of video data.

In any of the preceding example aspects of the method, the method may also include: determining, from a speed control parameter, whether to perform at least hand detection for the current frame of video data; and responsive to determining that the speed control parameter indicates that at least hand detection should be performed, performing hand detection in the current frame of video data.

In any of the preceding example aspects of the method, the method may also include: determining, from an obtained current frame of depth data, for each fingertip location associated with each of the up to two detected hands, whether the respective fingertip location is associated with a first touch state; and determining the content selection gesture when the respective fingertip location is considered to have the first touch state.

In a preceding example aspect of the method, the respective fingertip location may be determined to be associated with the first touch state when a respective fingertip depth associated with the fingertip location is within a predetermined depth margin of a background depth map.

In a preceding example aspect of the method, the background depth map may be a statistical model computed from one or more frames of depth data when no hand is detected.

In any of the preceding example aspects of the method, the content selection gesture may be identified as a region of interest (ROI) selection gesture, based on determining two fingertip locations associated with two detected hands, and the selected content may correspond to the ROI defined by the two fingertip locations.

In any of the preceding example aspects of the method, the content selection gesture may be identified as a text selection gesture, based on determining two fingertip locations associated with two detected hands, and the selected content may correspond to a text section defined between a first word in the content data corresponding to a first fingertip location and a second word in the content data corresponding to a second fingertip location.

In an example aspect, the present disclosure describes a device including: a processing unit coupled to a memory storing machine-executable instructions thereon. The instructions, when executed by the processing unit, cause the device to: detect one or more hands in an obtained current frame of video data; determine a respective fingertip location associated with each of up to two detected hands of the detected one or more hands; identify a content selection gesture corresponding to the up to two detected hands; and extract selected content indicated by the content selection gesture, wherein indication of the selected content is further based on the respective up to two fingertip locations.

In a preceding example aspect of the device, the device may further include: an optical sensor for obtaining the current frame of video data.

In any of the preceding example aspects of the device, the instructions may cause the device to detect the respective fingertip location associated with each of the up to two detected hands by: using hand bounding boxes corresponding to the up to two detected hands, performing hand classification and hand pose detection to determine the respective fingertip location associated with each of the up to two detected hands.

In any of the preceding example aspects of the device, hand classification and hand pose detection may be performed to also determine a respective gesture label with each of the up to two detected hands, and the content selection gesture may be identified based on the respective up to two gesture labels.

In any of the preceding example aspects of the device, each of the up to two gesture labels may represent a gesture class selected from: a point gesture, or an open hand gesture.

In any of the preceding example aspects of the device, extracting the selected content may include extracting a portion of the current frame of video data indicated by the content selection gesture and performing content recognition in the portion of the current frame of video data.

In any of the preceding example aspects of the device, the memory may include a content database, and extracting the selected content may include extracting the selected content from content data stored in the content database.

In a preceding example aspect of the device, the instructions may further cause the device to: for a first frame of video data prior to obtaining the current frame of video data: determine there is a content change; obtain content data recognized from content captured in the first frame of video data; and store the content data in the content database.

In a preceding example aspect of the device, the instructions may cause the device to determine the content change by: determining a difference between a statistical characteristic of the first frame of video data and another frame of video data captured prior to the first frame, wherein the determined difference is greater than a preset threshold.

In a preceding example aspect of the device, the instructions may cause the device to determine the content change by: detecting a hand in the first frame of video data; and identifying a content change gesture, corresponding to the detected hand in the first frame of video data, indicating the content change.

In a preceding example aspect of the device, the instructions may cause the device to identify the content change gesture by: using a hand bounding box corresponding to the detected hand in the first frame of video data, performing hand classification to determine a gesture label associated with the detected hand in the first frame of video data. The content change gesture may be identified based on the gesture label associated with the detected hand in the first frame of video data.

In any of the preceding example aspects of the device, the instructions may further cause the device to: determine, from a speed control parameter, whether to perform at least hand detection for the current frame of video data; and responsive to determining that the speed control parameter indicates that at least hand detection should be performed, perform hand detection in the current frame of video data.

In any of the preceding example aspects of the device, the instructions may further cause the device to: determine, from an obtained current frame of depth data, for each fingertip location associated with each of the up to two detected hands, whether the respective fingertip location is associated with a first touch state; and determine the content selection gesture when the respective fingertip location is considered to have the first touch state.

In a preceding example aspect of the device, the device may include a depth sensor for obtaining the current frame of depth data.

In any of the preceding example aspects of the device, the respective fingertip location may be determined to be associated with the first touch state when a respective fingertip depth associated with the fingertip location is within a predetermined depth margin of a background depth map.

In a preceding example aspect of the device, the background depth map may be a statistical model computed from one or more frames of depth data when no hand is detected.

In any of the preceding example aspects of the device, the content selection gesture may be identified as a region of interest (ROI) selection gesture, based on determining two fingertip locations associated with two detected hands. The selected content may correspond to the ROI defined by the two fingertip locations.

In any of the preceding example aspects of the device, the content selection gesture may be identified as a text selection gesture, based on determining two fingertip locations associated with two detected hands. The selected content may correspond to a text section defined between a first word in the content data corresponding to a first fingertip location and a second word in the content data corresponding to a second fingertip location.

In any of the preceding example aspects of the device, the instructions may further cause the device to: providing an output based on the selected content.

In the preceding example aspect of the device, the device may include a display for displaying the output.

In any of the preceding example aspects of the device, the output may include: a translation of text included in the selected content; an audio reading of text included in the selected content; or a virtual overlay indicating the selected content.

In any of the preceding example aspects of the device, the device may be one of: a smartphone; a tablet; a laptop; a smart light device; a reader device; a smart reader device; an artificial reality device; or a virtual reality or augmented reality device.

In an example aspect, the present disclosure describes a computer-readable medium having machine-executable instructions stored thereon. The instructions, when executed by a processing unit of a device, cause the device to perform any of the preceding example aspects of the method.

In an example aspect, the present disclosure describes a computer program comprising instructions which, when the program is executed by a computer, cause the computer to carry out any of the preceding example aspects of the method.

BRIEF DESCRIPTION OF THE DRAWINGS

Reference will now be made, by way of example, to the accompanying drawings which show example embodiments of the present application, and in which:

FIGS. 3A-3F illustrate some example gestures that may be detected and recognized by an example device, in accordance with examples of the present disclosure;

Similar reference numerals may have been used in different figures to denote similar components.

DESCRIPTION OF EXAMPLE EMBODIMENTS

Figure 1:
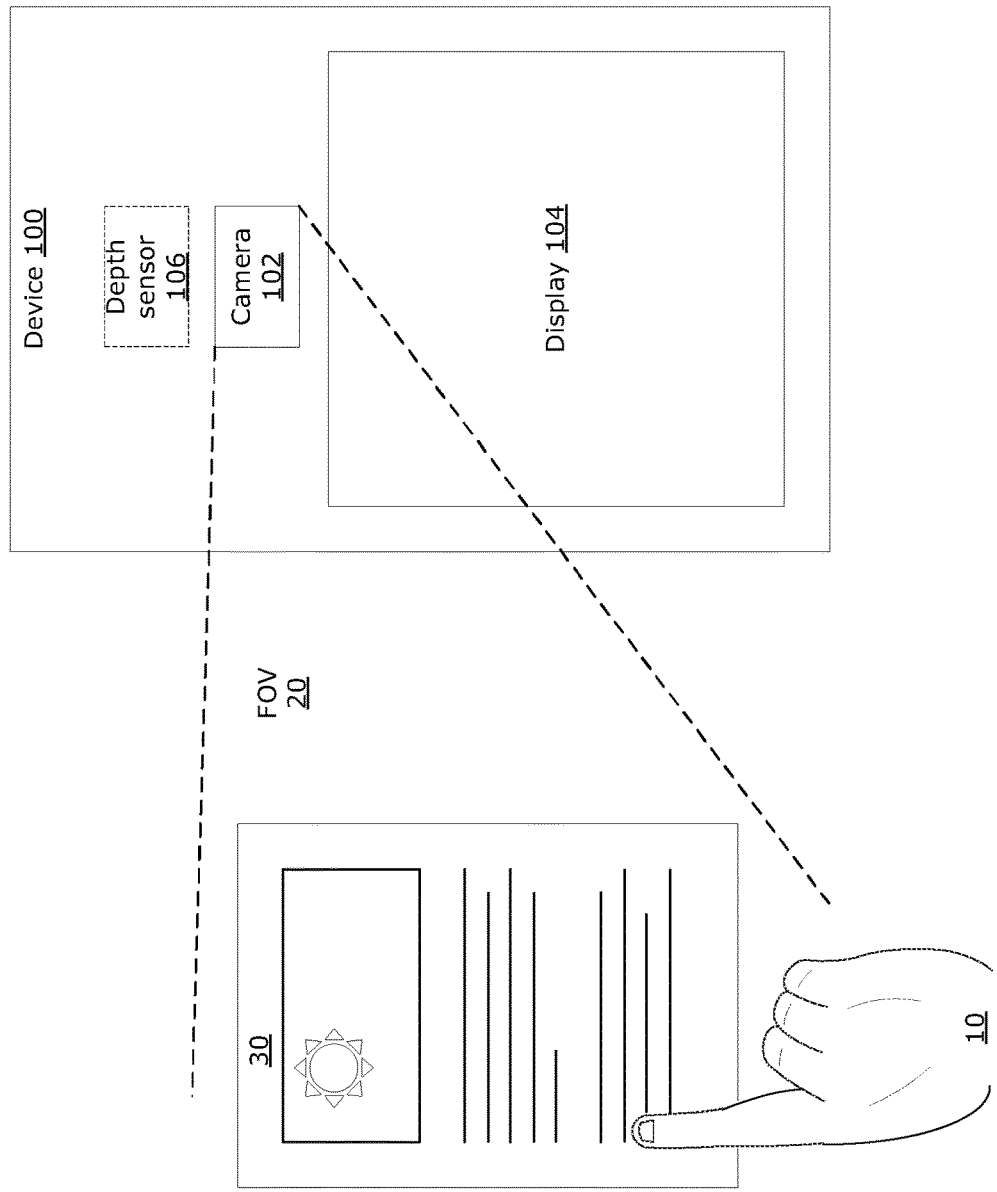
FIG. 1 is a block diagram illustrating a user interacting with an example machine vision-capable device.

In various examples, the present disclosure describes methods and devices for machine vision-based gesture detection, for selection of content. For example, a machine vision-capable device may be a mobile communication device (e.g., smartphone), a tablet device, a laptop device, a desktop device, a smart lighting device, a smart speaker device, or a dedicated reader device among other possibilities. Examples of the present disclosure may also be implemented in devices that have touch detection capabilities as well as machine vision capabilities.

The machine vision-based detection of gestures for selection of content, as described herein, may be used to enable selection of any visual content, and in particular any non-digital visual content. In the present disclosure, visual content may refer to any content that can be detected and recognized using machine vision algorithms, including any content that can be viewed by human vision. In the context of the present disclosure, visual content may include electronic content that is displayed (e.g., displayed on a screen to be viewed by a human), and that is detectable and recognizable using machine vision algorithms (i.e., not detected as digital data). Non-digital content may refer to content that is not displayed digitally, including text and/or image content in any physical medium (e.g., a physical page, physical book, physical sign, etc.), among other possibilities.

To assist in understanding the present disclosure, some existing technologies for gesture-based content selection are first discussed. Existing technologies may be categorized into two categories: touch-based content selection and machine vision-based content selection.

In existing technologies for touch-based content selection, a device having a touch sensor (e.g., a touchscreen) is required. Typically, the device displays digital content on a touchscreen, and detects a touch gesture using the touch screen. The touch gesture is recognized and interpreted by the device as a selection of a corresponding portion of the displayed digital content. A limitation of touch-based content selection is the requirement for touchscreen hardware, and being limited to content that can be digitally displayed on the touchscreen.

In existing technologies for machine vision-based content selection, a device having a camera captures a video of a user's hand. The device uses computer vision algorithms to detect and recognize hand gestures captured in the video. Existing computer vision-based technologies are based on detection and recognition of single-handed gestures. As a result, the types of user interactions that can be supported are limited to relatively simple content selection, such as selection of a single word. It is difficult, if not impossible, to support more complex content selection (e.g., selection of a paragraph or a region of interest (ROI)) using single-handed gestures. For example, some existing machine vision-based technologies detect user selection of a sentence by detecting and recognizing a single-handed gesture drawing a line from a start to an end of a sentence. However, this approach has been found to suffer from a high occurrence of false positives (i.e., a sentence is selected when such selection is not intended by the user).

Existing machine vision-based content selection technologies also may encounter difficulties in recognizing visual content that is blocked by a user's hands. Further, existing machine vision-based content selection technologies typically require implementation of multiple neural network modules, including a module for hand detection, a module for hand shape classification, and a module for gesture recognition. The requirement to execute multiple neural network modules means that such technology may not be practical to implement on devices having limited resources (e.g., mobile devices such as smartphones, tablets, laptops, smart light devices, smart speaker devices, reader devices, etc.).

The present disclosure describes devices and methods for machine vision-based detection of human hand gestures for content selection. In particular, the present disclosure enables two-handed gestures to be used for selection of content. The present disclosure also describes a method for detecting a change in the visual content (e.g., a page turn, a new page or book, a different sign, etc.), which helps to more efficiently implement content scanning and recognition operations.

FIG. 1 shows an example of a user interacting with a machine vision-capable device 100. In this simplified diagram, the device 100 includes a camera 102 that captures a field-of-view (FOV) 20. The camera 102 may be any optical sensor capable of capturing a video (comprising a plurality of frames) of the FOV 20 in real-time or near real-time. The captured FOV 20 includes a hand 10 of the user and a visual content 30. The visual content 30 may include textual content and/or image content, for example. As will be discussed further below, the user may place one or both hands 10 in the FOV 20, and may use single-handed or two-handed gestures within the FOV 20 to select textual and/or image content from the visual content 30.

The device 100 also includes a display 104 providing an output, such as an image of the currently captured FOV 20, a virtual overlay indicating a detected selection in the visual content 30, a translation of the detected visual content 30, etc. Although not shown in FIG. 1, the device 100 may include other output devices, such as a speaker to provide audio output (e.g., audio output of the selected text in the visual content 30). The device 100 may also include other sensors, such as an optional depth sensor 106 (e.g., an infrared depth camera) to detect depth of objects in the FOV 20, as discussed further below.

Figure 2:
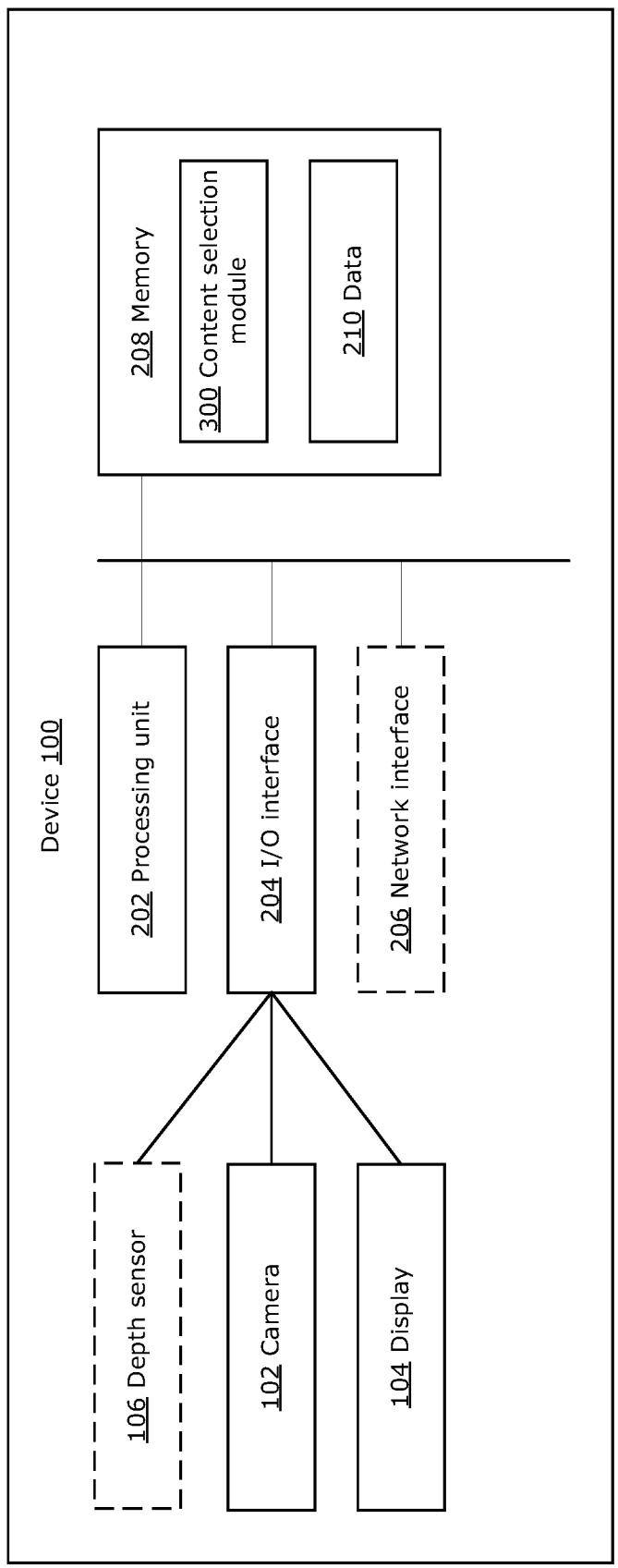
FIG. 2 is a block diagram illustrating some components of an example device, which may be used to implement examples of the present disclosure.

FIG. 2 is a block diagram showing some example components of the device 100. Although an example embodiment of the device 100 is shown and discussed below, other embodiments may be used to implement examples disclosed herein, which may include components different from those shown. Although FIG. 2 shows a single instance of each component, there may be multiple instances of each component shown.

The device 100 includes at least one processing unit 202, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The device 100 also includes at least one input/output (I/O) interface 204, which interfaces with input devices such as the camera 102 and optional depth sensor 106, and output devices such as the display 104. The device 100 may include other input devices (e.g., mechanical buttons, microphone, touchscreen, keyboard, infrared sensor, etc.) and other output devices (e.g., speaker, vibration unit, etc.). The camera 102 (or other input device) may have capabilities for capturing live video (i.e., in real-time or near real-time) as a sequence of video frames. The captured frames of video data may be buffered by the I/O interface 204 and provided to the processing unit 202 to be processed in real-time or near real-time (e.g., within 10 ms).

The device 100 may include an optional network interface 206 for wired or wireless communication with other computing systems and/or a network (e.g., an intranet, the Internet, a P2P network, a WAN and/or a LAN). The network interface 206 may include wired links (e.g., Ethernet cable) and/or wireless links (e.g., one or more antennas) for intra-network and/or inter-network communications. The network interface 206 may enable the device 100 to communicate with other computing systems (e.g., a cloud-based computing platform) to access services provided by the other computing systems (e.g., to access cloud-based translation services).

The device 100 includes at least one memory 208, which may include a volatile or non-volatile memory (e.g., a flash memory, a random access memory (RAM), and/or a read-only memory (ROM)). In some examples, the device 100 may also include an electronic storage unit (not shown), such as a solid state drive, a hard disk drive, a magnetic disk drive and/or an optical disk drive.

The non-transitory memory 208 may store instructions for execution by the processing unit 202, such as to carry out example embodiments described in the present disclosure. For example, the memory 208 may include instructions for executing a content selection module 300. The memory 208 may include other software instructions, such as for implementing an operating system and other applications/functions. The memory 208 may also include data 210, such as learned parameters for a hand pose detection neural network implemented by the content selection module 300. The memory 208 may also store temporary data (e.g., in a buffer or short-term cache), such as recognized text from a visual content within a current FOV 20 of the camera 102.

The device 100 may additionally or alternatively execute instructions from an external memory (e.g., an external drive in wired or wireless communication with the device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

To help in understanding the present disclosure, a discussion of hand gestures is first provided. In the present disclosure, a hand gesture is generally defined as a hand pose that may be recognized by the device 100 (e.g., using a hand pose detection neural network, as discussed further below) as a particular command input. In the present disclosure, the term hand pose refers to the shape of the hand, and a hand pose may be detected by detecting joint keypoints (e.g., 21 keypoints) of the hand. A hand pose can be classified as a hand gesture (i.e., belonging to a particular gesture class) that is recognized by the device 100. Not all hand poses may be valid hand gestures recognized by the device 100. In the present disclosure, the device 100 may recognize singled-handed gesture (involving a single hand having a particular hand pose) as well as two-handed gestures (involving two hands each having a particular hand pose).

FIGS. 3A-3F illustrate examples of single-handed gestures that may be recognized by the device 100. FIGS. 3A and 3B illustrate examples that may be recognized as an "open hand" gesture (e.g., a hand pose detection neural network may classify the hand pose as belonging to an "open hand" gesture class). FIGS. 3C-3F illustrate examples that may be recognized as a "point" gesture (e.g., a hand pose detection neural network may classify the hand pose as belonging to a "point" gesture class). In the case of a point gesture, the location of an extended fingertip may also be detected and recognized as a location indicated by the point gesture. Other gesture classes may or may not be recognized by the device 100. As will be discussed further below, an open hand gesture may be processed as input indicating a change of content, and a point gesture may be processed as input indicating a selection of text or image content.

Figure 4B:
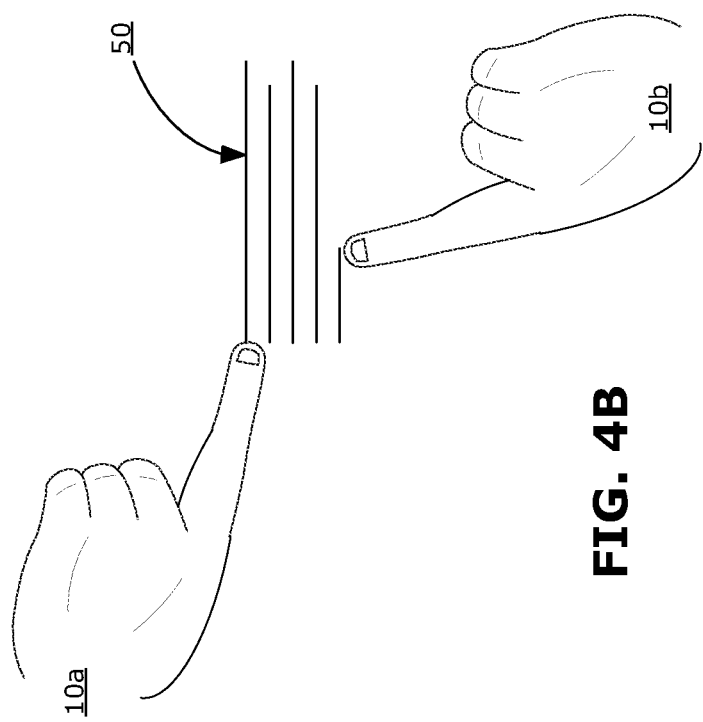
FIGS. 4A-4B illustrate some example two-handed gestures that may be detected and recognized by an example device, in accordance with examples of the present disclosure.
Figure 4A:
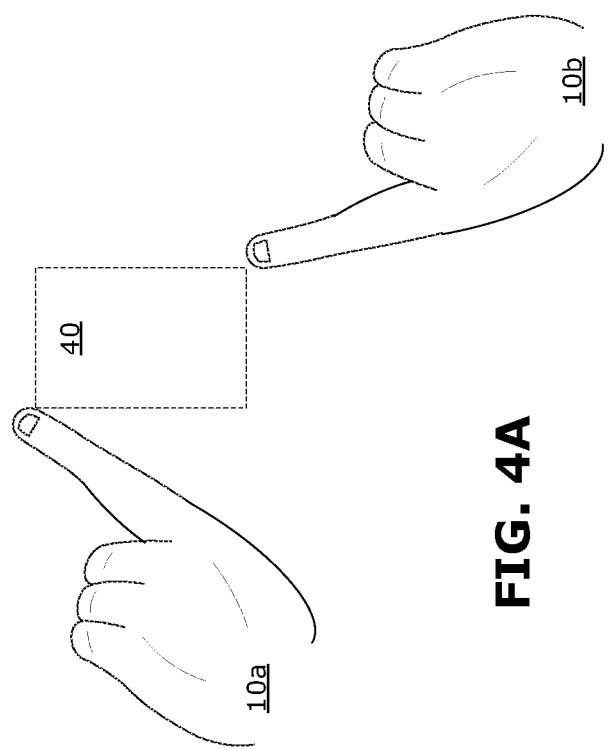

FIGS. 4A and 4B illustrate examples of two-handed gestures that may be recognized by the device 100. Two-handed gestures may be recognized as a combination of two singled-handed gestures. For example, FIGS. 4A and 4B illustrate examples of a two-handed gesture formed from two point gestures (i.e., two hands 10a, 10b, each performing a respective point gesture). A two-handed gesture formed from two point gestures may be referred to as a "two-point" gesture. In FIG. 4A, a two-point gesture is used to select a rectangular ROI 40, in which the locations of the opposite corners of the ROI 40 are selected by the fingertip locations of respective point gestures. In FIG. 4B, a two-point gesture is used to select a text section 50, in which the selected text section is defined as the text between a first word corresponding to a first fingertip location of a first point gesture and a second word corresponding to a second fingertip location of the second point gesture.

Hand gestures other than an open hand gesture or a point gesture may not be recognized as valid gestures and/or may not be gestures that are used for content selection.

In general, the devices and methods disclosed herein may support recognition of various hand gestures for selection of various visual content. For example, a single word may be selected by the device 100 recognizing a single-handed point gesture where the selected word is indicated by the location of the fingertip. In another example, a sentence may be selected by the device 100 recognizing a moving single-handed point gesture where the selected sentence is indicated by the point gesture moving from a first word to a last word of the selected sentence. In another example, a ROI (e.g., a rectangular area including text content, including image content, or including both text and image content) may be selected by the device 100 recognizing a two-handed gesture. The ROI may be selected by defining a first corner of the ROI at the location indicated by the fingertip location of a first point gesture, and by defining a second opposite corner of the ROI at the location indicated by the fingertip location of a second point gesture (e.g., as illustrated in FIG. 4A). In another example, a section of text (e.g., a single sentence, multiple sentences, a paragraph, multiple paragraphs, etc.) may be selected by the device 100 recognizing a two-handed gesture. The section of text may be selected by identifying the first word of the section of text as indicated by the fingertip location of a first point gesture, and by identifying the last word of the section of text as indicated by the fingertip location of a second point gesture (e.g., as illustrated in FIG. 4B).

The present disclosure describes a content selection module 300, which may be executed by the device 100 to recognize the hand gestures described above, and to select content based on the hand gestures. In some examples, the content selection module 300 includes a deep neural network for joint hand pose detection, refinement and classification.

Figure 5:
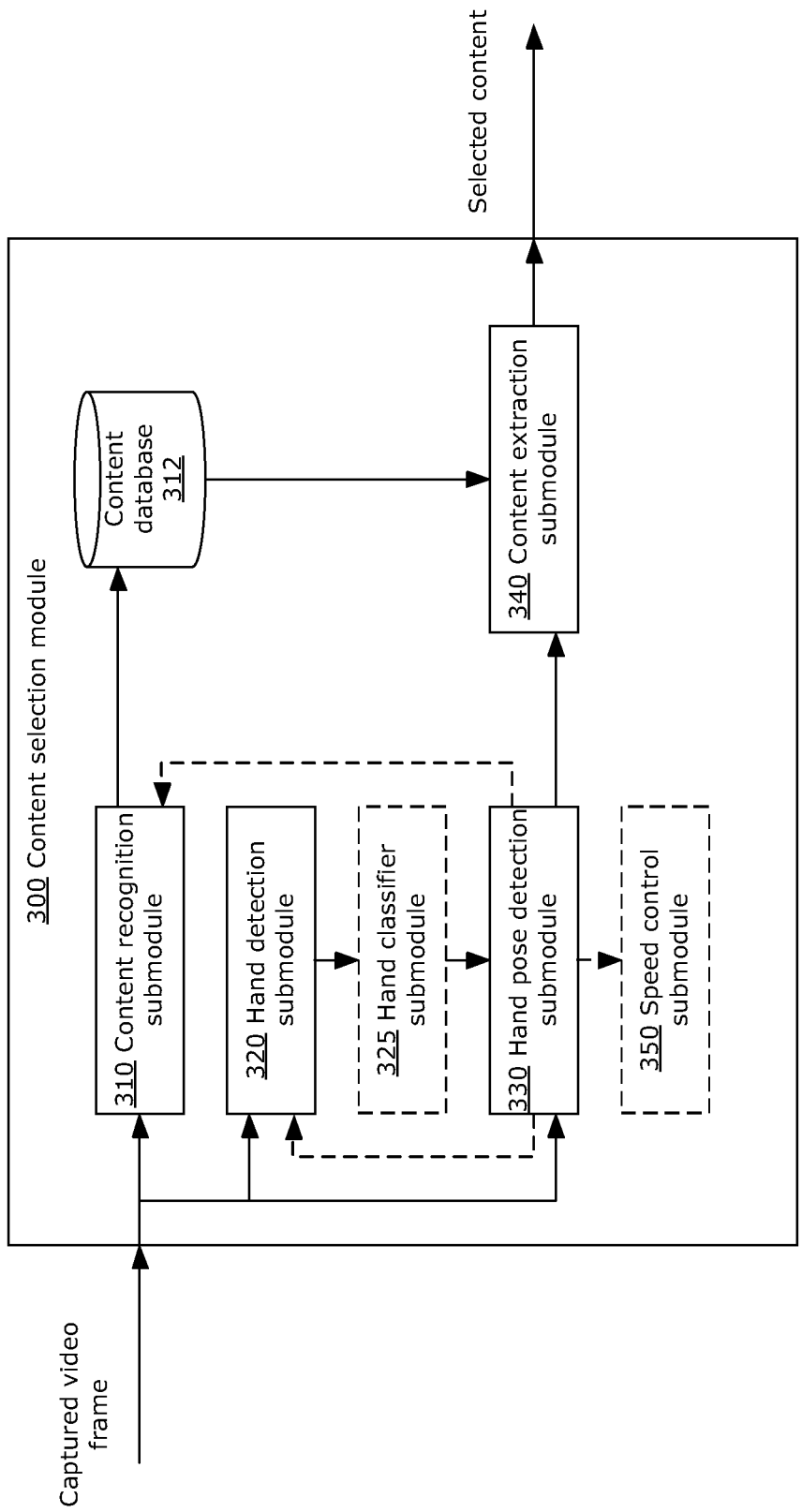
FIG. 5 is a block diagram illustrating some details of an example content selection module that may be implemented in an example device, in accordance with examples of the present disclosure.

FIG. 5 is a block diagram illustrating example submodules of the content selection module 300. The content selection module 300 may be implemented by the device 100 (e.g., the processing unit 202 may execute instructions stored in the memory 208 to cause the device 100 to perform the operations of the content selection module 300).

In the example shown, the content selection module 300 includes a content recognition submodule 310, a hand detection submodule 320, a hand pose detection submodule 330, a content extraction submodule 340, and an optional speed control submodule 350. It should be understood that the submodules 310, 320, 330, 340, 350 are only exemplary and are not intended to be limiting. For example, the content selection module 300 may have greater or fewer submodules than those illustrated in FIG. 5. For example, the content recognition submodule 310 may be omitted and content recognition may be performed by another module of the device 100, external to the content selection module 300. Further, any functions described as being performed by any specific one of the submodules 310, 320, 330, 340, 350 may be performed by any other one of the submodules 310, 320, 330, 340, 350, or may be performed by the content selection module 300. Thus, the implementation of the content detection module 300 may be different in other embodiments. Generally, the functions of the content detection module 300 may be implemented in various suitable ways and remain within the scope of the present disclosure.

As described previously, a camera 102 (or other optical sensor) of the device 100 captures a live video of a FOV 20. Frames of the captured video are provided (in real-time or near real-time) as input (e.g., as 2D image data) to the content selection module 300. The content selection module 300 may process one frame at a time, or may process frames in batches. An overview of the submodules 310, 320, 330, 340, 350 is now provided. The following discussion will describe the content selection module 300 in the case where a single input frame is processed at a time, although this is not intended to be limiting.

The content recognition submodule 310 performs content recognition of the visual content captured in the current frame of video data, including text recognition (e.g., using any suitable optical character recognition (OCR) algorithm, which may involve using trained neural networks) and/or image segmentation and recognition (e.g., using any suitable image segmentation and classification algorithm, which may involve using trained neural networks). In some examples, the content recognition submodule 310 may, instead of performing text or image recognition operations itself, use services provided by an external system (e.g., a server or cloud computing platform external to the device 100) to perform text or image recognition of the current frame.

The recognized content (e.g., text content and/or image content) may be stored in a content database 312 (which may be a temporary cache or buffer of the memory 208). Notably, the content recognition does not need to be performed by the content recognition submodule 310 in response to detection of a content selection gesture (at which time some of the content may be blocked by the presence of the user's hand). Instead, the content recognition submodule 310 may perform operations to recognize the visual content and store the content in the content database 312 at a frame when a change of content is detected (e.g., at a frame in which the visual content is not blocked by a user's hand that is performing a hand gesture). Then, when a content selection gesture is subsequently detected, the previously-recognized content may be accessed from the content database 312.

To avoid unnecessary use of computer resources (including processing power, memory resources, etc.), the content recognition submodule 310 may perform content recognition only when a change in the visual content has been detected. For example, the content recognition submodule 310 may perform operations to detect if there has been a change in the visual content (e.g., a change in visual content between the current frame and a previous frame). In another example, a hand gesture (e.g., an open hand gesture recognized by the hand pose detection submodule 330) may be detected as user input to indicate that content recognition should be performed. Because the recognized content is then stored in the content database 312, content recognition does not need to be performed at the time that a content selection gesture is detected.

The hand detection submodule 320 performs operations to detect the presence of a user's hand in the current frame. If a hand is detected in the current frame, the hand detection submodule 320 outputs a bounding box for each hand that has been detected (i.e., a hand bounding box corresponding to each detected hand). The hand detection submodule 320 may implement a neural network that has been trained to perform a hand detection task, such as Yolov3 (as described by Redmon et al., "Yolov3: An incremental improvement", arXiv preprint *arXiv:*1804.02767, 2018), Efficientnet (as described by Tan et al., "Efficientnet: Rethinking model scaling for convolutional neural networks", *ICML*, 2019) or DSOD (as described by Shen et al., "DSOD: Learning deeply supervised object detectors from scratch", *Proc. ICCV*, p7, 2017). In some examples, a hand classifier submodule 325 may be optionally included in the content selection module 300. The hand classifier submodule 325 may receive the hand bounding box from the hand detection sub module 320 and output a label representing an estimated gesture class (e.g., open hand or point gesture) and a gesture confidence score (i.e., representing the confidence in the estimated gesture class, in particular confidence in whether the detected hand is a valid gesture such as a point gesture) for the detected hand. The hand classifier submodule 325 may implement a neural network that has been trained to perform a hand classification task, such as ResNet (as described by He, Kaiming, et al. "Deep residual learning for image recognition." *CVPR,* 2016). It should be noted that the estimated label outputted by the hand classifier submodule 325 is not based on pose detection (i.e., is not based on detecting joint keypoints) and may be less accurate than the label estimated by the hand pose detection submodule 330 (as such, the hand classifier submodule 325 may be referred to as a "coarse" hand classifier submodule). However, the computational complexity of the hand classifier submodule 325 may be much less than that of the hand pose detection submodule 330. The hand classifier submodule 325 may be used to reduce the number of hand bounding boxes having invalid gestures that are sent to the hand pose detection submodule 330 to process (e.g., only hand bounding boxes for which the hand classifier submodule 325 outputs a valid gesture class may be processed by the hand pose detection submodule 330), and thus reduce the overall computational complexity of the content selection module 300.

Execution of a trained neural network to perform hand detection may be computationally expensive (e.g., requiring a significant amount of processing power and/or memory resources). To more efficiently use such computer resources, the hand detection submodule 320 may be controlled by the optional speed control submodule 350, so that hand detection is not necessarily performed on every frame that is inputted to the content detection module 300. In examples where the optional speed control submodule 350 is omitted, the hand detection submodule 320 may be configured to perform hand detection at a set interval, such as every n frames (where n is a positive integer greater than zero).

When hand detection is not performed, the hand detection submodule 320 may instead perform motion tracking (e.g., using any suitable optical flow algorithm, including non-machine learning-based methods such as the Lucas-Kanade method) to estimate the location of the hand bounding box of a previously detected hand. For example, if the hand detection submodule 320 is controlled such that hand detection (e.g., using a hand detection neural network) every five frames, then hand detection may be performed for a first frame to detect and output the hand bounding box for a hand in the frame, and then for the next four frames (in which hand detection is not performed) the hand detection submodule 320 may use motion tracking to estimate the location of the hand bounding box for the previously detected hand.

The bounding box outputted by the hand detection submodule 320 for each detected hand (i.e., the hand bounding box corresponding to each detected hand) is received by the hand pose detection submodule 330. If there is a plurality of detected hands, then a respective plurality of hand bounding boxes are received by the hand pose detection submodule 330. In some examples, the functions of the hand pose detection submodule 330 may be called to perform hand pose detection only for up to two detected hands, as discussed further below. The hand pose detection submodule 330 performs operations to detect a hand pose (i.e., by detecting key points of a detected hand) and also to classify the hand pose (i.e., to classify the hand pose as a point gesture, an open hand gesture, or an invalid gesture) for each detected hand. The hand pose detection submodule 330 may use a deep neural network, having an architecture as discussed further below, that jointly performs hand pose detection and hand pose classification (rather than using separate hand pose detection neural network and hand pose classification neural network); however it should be understood that the hand pose detection submodule 330 may be implemented using other neural network architectures. The hand pose detection submodule 330 outputs, for each hand bounding box, a gesture label (e.g., a predicted gesture label from the set of possible gesture labels representing all possible gesture classes: open hand gesture, point gesture) representing a detected hand gesture and also outputs an associated set of detected key points for each detected hand gesture. If a gesture label representing a recognized gesture (e.g., open hand gesture or point gesture) can be assigned to the hand pose, the hand pose may be considered to be a valid gesture. If a gesture label cannot be assigned to the hand pose (e.g., the hand pose cannot be classified as an open hand gesture or point gesture with sufficiently high confidence or sufficiently high likelihood), then the hand pose may be considered to be an invalid gesture.

The hand pose detection submodule 330 may detect a fingertip (e.g., the longest fingertip in the detected hand pose) and output a fingertip bounding box and fingertip location for the detected fingertip (e.g., outputted to the content extraction submodule 340, and optionally to the content recognition submodule 310 if content recognition is performed at the time that a content selection gesture is detected, as discussed below). In some examples, the fingertip bounding box and/or fingertip location may also be outputted to another module (e.g., a visual overlay module) to enable the device 100 to display (e.g., on the display 104) a virtual representation of the detected fingertip bounding box and/or fingertip location as an overlay over the current frame. This may serve as visual feedback to enable a user to better control their hand 10 to indicate the desired content. It should be noted that the fingertip bounding box and location may be outputted only if the point gesture is detected, or may be outputted for both the point gesture and the open hand gesture (in the case of the open hand gesture, the detected fingertip may be the longest finger of the open hand gesture). The fingertip bounding box and fingertip location may not be outputted if the hand pose is an invalid gesture (e.g., any hand pose that cannot be classified as an open hand gesture or point gesture).

The hand pose detection submodule 330 may also perform fingertip tracking (e.g., using any suitable motion tracking algorithm, such as optical flow) to track a location of a fingertip if a valid gesture was previously detected (e.g., within a predefined number of previous frames), even if a valid gesture is not detected in the current frame. For example, if a portion of a hand is obscured in a current frame, the location of the fingertip may still be tracked by estimating the location of the fingertip bounding box based on the fingertip bounding box from a previous frame (e.g., generated by the hand pose detection submodule 330 from a previous frame in which the hand pose is a valid gesture) and detecting the location of the fingertip within the fingertip bounding box.

The gesture label representing a detected hand gesture and the associated fingertip location is outputted to the content extraction submodule 340. Optionally, such as in examples where an open hand gesture is recognized by the content selection module 300 as user input indicating a change of visual content, the gesture label representing a detected hand gesture may also be outputted to the content recognition submodule 310. Optionally, if the speed control submodule 350 is implemented, the gesture label representing a detected hand gesture may also be outputted to the speed control submodule 350 to enable dynamic speed control, as discussed further below.

The content extraction submodule 340 receives the gesture label representing a detected hand gesture and the fingertip location associated with the detected hand gesture. Depending on the received gesture label, and depending on whether a single gesture label (indicating a single-handed gesture) or two gesture labels (indicating a two-handed gesture) is received, the content extraction submodule 340 accesses the content stored in the content database 312 and extracts the content indicated by the fingertip location. The extracted content may be text content (e.g., a word, phrase, sentence, paragraph, etc. from the visual content), image content (e.g., an image, multiple images or image portion from the visual content), or a combination of text and image content. The extracted content is outputted by the content selection module as selected content.

In some examples, instead of or in addition to the content extraction submodule 340 accessing the content stored in the content database 312, real-time content recognition and extraction may be used. For example, instead of accessing the content database 312, the content extraction submodule 340 may instead crop the captured video frame to an image patch corresponding to an ROI defined by a single-handed gesture or a two-handed gesture. The cropped image patch may be processed by the content recognition submodule 310 (e.g., using OCR or image recognition), and the recognized content of the cropped image patch may be the extracted content, which is outputted by the content selection module as selected content. In such a case, the content recognition submodule 310 may not necessarily perform content recognition when a content change is detected.

The optional speed control submodule 350 performs operations to set a speed control parameter that controls the speed (e.g., frequency or frame interval) at which hand detection should be performed by the hand detection submodule 320. For example, the speed control parameter may be a positive integer n, where hand detection is to be performed every n frames. The speed control submodule 350 may perform dynamic speed control, in which the speed control parameter is dynamically varied based on the detected hand gesture. The speed control submodule 350 may be configured to set the speed control parameter such that hand detection is performed at a higher speed (e.g., set the speed control parameter to a smaller positive integer value) when a point gesture has been detected and at a lower speed (e.g., set the speed control parameter to a larger positive integer value) when a point gesture has not been detected. In some examples, the speed control submodule 350 may perform non-dynamic (or fixed) speed control, in which the speed control parameter is set at a fixed value (e.g., at a fixed positive integer, such as an integer in the range of 2 to 10). For example, a user may manually select a set speed for hand detection. In some examples, if non-dynamic speed control is used, the non-dynamic speed control may be configured into the hand detection submodule 320 rather than using the speed control submodule 350.

Figure 6:
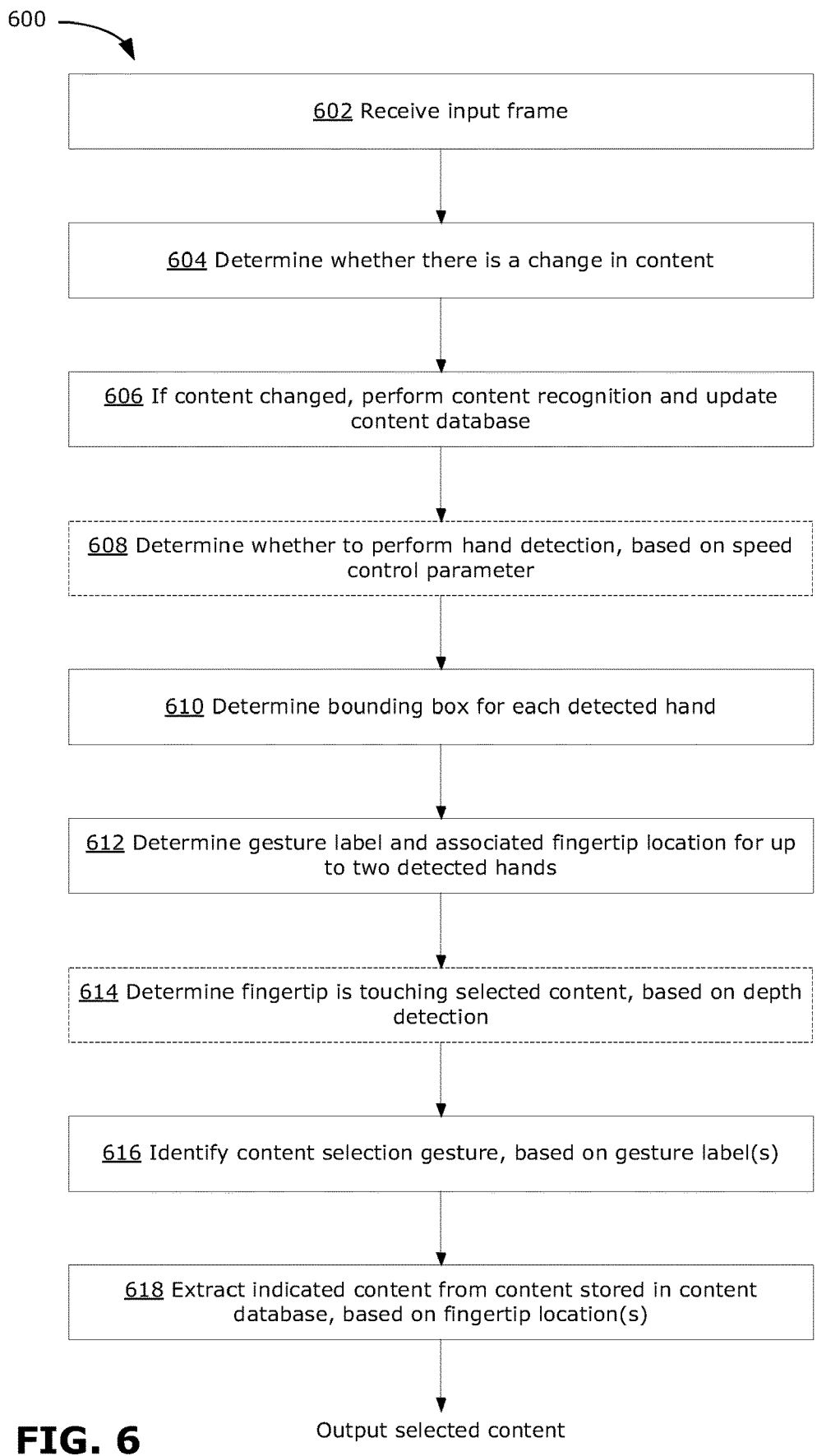
FIG. 6 is a flowchart illustrating an example method for processing a content selection gesture, in accordance with examples of the present disclosure.

FIG. 6 is a flowchart illustrating an example method 600 for content selection, which may be implemented using the content selection module 300 (including the submodules 310, 320, 330, 340, 350).

At 602, an input frame is received. The input video frame may be received one at a time, in real-time or near real-time. The input frame may be the raw, unprocessed data captured by the camera 102, or may be minimally processed (e.g., normalized).

At 604, it is determined whether there is a change in content. A change in content may be determined automatically (i.e., without requiring explicit user input), for example using the content recognition submodule 310. For example, the current frame may be compared to a previous frame (e.g., at least one previous frame may be stored in a temporary cache or buffer of the memory). The comparison between the current frame and the previous frame may be a statistical comparison that compares the frames based on a statistical characteristic such as color histograms, pixel intensity, RGB variance, luminosity, etc. If the statistical characteristic of the current frame differs from that of the previous frame by an amount greater than a preset threshold, then a change in content may be determined. In some examples, a relatively low-computation processing of the current frame may be performed (e.g., using a convolutional neural network having few layers) to extract relatively simple feature information such as edge detection, which may be encoded in a feature vector. The distance between the feature vector for the current frame and that of the previous frame may be computed (e.g., using simple Euclidean distance computation) and if the distance is greater than a preset threshold, then a change in content may be determined.

In some examples, a change in content may be determined when user input indicating a change in content is detected. For example, a user may provide input via an input device such as a microphone, keyboard, mouse, touchscreen or mechanical button, to indicate that the visual content has changed. In some examples, the user input may be a gesture input, such as an open hand gesture. For example, if the open hand gesture was recognized (e.g., by the hand pose detection submodule 330) in a previous frame, this may be input indicating that the visual content has changed and that the recognized content stored in the content database 312 should be updated.

In some examples, a change in content may be determined when there is no previous frame (e.g., no previous frame is stored in a temporary cache or buffer of the memory). For example, there may be no previous frame when the content selection module 300 is activated (e.g., when the device 100 is turned on), since any previously stored frame (e.g., from a previous time when the content selection module 300 was used) may have been discarded from temporary memory when the content selection module 300 was inactivated.

At 606, in response to a determination that the content has changed, content recognition is performed (e.g., using the content recognition submodule 310) and the recognized content stored in the content database 312 is updated.

As previously mentioned, the content recognition submodule 310 may implement any suitable text recognition or image recognition algorithm (e.g., using any suitable trained neural network) to perform the content recognition. In another example, the content recognition submodule 310 may communicate with an external system that provides a text recognition or image recognition service. For example, the current frame may be uploaded (e.g., as 2D image data) to an external server or cloud-computing platform that performs the text and/or image recognition, and that returns the recognized content to the content recognition submodule 310. Regardless of how content recognition is performed, the recognized content (e.g., recognized text using OCR and/or recognized image using an image segmentation method, an object detector, and/or an image classifier) and the associated location of the recognized content (e.g., location of each recognized word in the current frame, or location of a hand bounding box of a recognized image in the current frame) is stored in the content database 312. It should be noted that, when the content database 312 is updated, the previously stored content (e.g., from a previous frame) may be discarded.

In some examples, instead of performing steps 604-606 to detect content change and perform content recognition to store content in the content database 312, content recognition may be performed at the time that content is extracted (i.e., in response to detection of a valid content selection gesture), as discussed above. Thus, in some examples, steps 604-606 may be omitted or may be optional.

Optionally, at 608, it is determined whether hand detection should be performed, based on the speed control parameter (e.g., controlled by the speed control submodule 350). For example, the speed control parameter may be a positive integer defining the frame interval for performing hand detection. If the speed control parameter is a positive integer n (where n is greater than zero), hand detection is performed every n frames. If n is equal to one, this means that hand detection is performed every frame; if n is equal to two, this means that hand detection is performed every other frame; other values of n may be used. A frame counter may be used to track the number of frames since the last hand detection was performed, and when the value of the frame counter is at least equal to the frame interval defined by the speed control parameter, this indicates that hand detection should be performed.

The speed control parameter may be dynamically set or set to a fixed value. The speed control parameter may be set such that the computer resources required for performing detection are reduced, and at the same time a satisfactory level of accuracy (e.g., able to consistently detect a hand gesture despite skipped frames) is achieved. If the speed control parameter is a fixed value, the value may be manually selected by a user, or may be set based on what has been found to be empirically satisfactory. If the speed control parameter is a dynamic value, the value may be varied dependent on whether a point gesture has been previously detected (e.g., detected in a previous frame). If a point gesture has been previously detected, this may indicate that hand detection should be performed more frequently and the speed control parameter may be set at a lower value such as in the range of 2 to 5 (i.e., indicating a shorter frame interval for hand detection); if a point gesture has not been previously detected, this may indicate that hand detection should be performed less frequently and the speed control parameter may be set at a higher value such as in the range of 6 to 10 (i.e., indicating a longer frame interval for hand detection).

At 610, a hand bounding box is determined (e.g., using the hand detection submodule 320) for each detected hand in the current frame. For example, hand detection may be performed, for example using a hand detection neural network, to detect one or more hands in the current frame and to define the hand bounding box for each hand. In some examples, hand detection may be performed only if it has been determined, at 608, that hand detection should be performed for the current frame; if it has been determined that hand detection should not be performed for the current frame, then the hand bounding box may be determined based on motion tracking (e.g., by estimating the position of the hand bounding box in the current frame based on optical flow between the current frame and a previous frame, where a hand bounding box has been defined in the previous frame).

If there are a plurality of hand bounding boxes defined for a respective plurality of detected hands, the hand bounding boxes may be ranked. For example, the hand bounding boxes may be ranked such that the hand bounding box for the most prominent (e.g., highest gesture confidence score, largest size, most central location, highest luminosity, etc.) detected hand is ranked highest. In some examples, a hand classifier submodule 325 may be used to estimate a gesture class and corresponding gesture confidence score (i.e., representing the confidence in the estimated gesture class, in particular confidence in whether the detected hand is a valid gesture such as a point gesture) and the hand bounding boxes may be ranked according to whether the corresponding detected hand belongs to one of the recognized gesture classes (e.g., open hand gesture or point gesture) and the associated confidence score. Ranking of the hand bounding boxes may enable the most relevant hand bounding boxes and associated detected hands to be identified, so that only the two most relevant hands are considered when performing subsequent hand pose detection.

At 612, a gesture label and associated fingertip location are determined (e.g., using the hand pose detection submodule 330) for each of up to two detected hands. For example, if a plurality of hand bounding boxes determined at 610 have been ranked based on prominence and/or relevance, then the gesture label and fingertip location may be determined for only the two highest ranked hand bounding boxes. In some examples, hand pose detection (e.g., using the joint hand pose detection and classification neural network, discussed further below) may be performed only if hand detection was performed (e.g., dependent on the speed control parameter). If hand pose detection is performed, then the gesture label and associated fingertip location is determined for each detected hand, based on detection of joint keypoints. If hand pose detection is not performed (e.g., if hand detection was not performed for the current frame), then the gesture label may be the gesture label that was determined previously (i.e., for a previous frame where hand pose detection was performed) and the fingertip location may be determined based on motion tracking.

Optionally, at 614, depth detection (e.g., using an optional depth sensor 106 of the device 100) may be used to determine whether the detected fingertip is considered to be touching the selected content (e.g., the depth of the fingertip and the depth of the content surface are within a predefined depth margin of each other). The depth detection may be performed to confirm that the gesture is a content selection gesture (e.g., to avoid a false positive, such as when a user is moving the hand above but not touching a page). For example, a point gesture may be considered to be a content selection gesture only if the fingertip of the point gesture is detected to be touching or close enough to be considered touching the selected content.

In some examples, if depth detection is not performed, a detected fingertip may be assumed to be touching the selected content if the fingertip location is substantially unchanged (e.g., within a defined area that allows for some margin of error) for at least a predefined time period (e.g., at least one second). For example, a point gesture may be considered to be a content selection gesture only if the fingertip of the point gesture is held at a substantially unchanged location for at least the predefined time period.

At 616, a content selection gesture is identified, based on the gesture label(s). The fingertip location may be used to identify whether the content selection gesture is a static gesture or a dynamic gesture. In particular, a content selection is identified when the gesture label(s), determined at 612, includes at least one gesture label representing a point gesture. The content selection gesture is also dependent on the number of gesture labels that represent a point gesture.

For example, if there is only one gesture label representing a point gesture, a single-handed point gesture may be identified. If there are two gesture labels each representing a respective point gesture, a two-handed point gesture may be identified.

Identifying the content selection gesture may also include identifying whether the gesture is a static gesture or a dynamic gesture, based on the location of the fingertip(s) over a past number of frames (e.g., over the past 100 frames, or over a number of frames that total a defined time period such as the past 1 second). If a fingertip location is substantially unchanged (e.g., within a defined area that allows for some margin of error) over the past number of frames, the corresponding point gesture may be identified as a static content selection gesture. If the fingertip location changes over time (e.g., displacement over the past number of frames exceeds the margin of error), the corresponding point gesture may be identified as a dynamic content selection gesture.

Some possible content selection gestures that may be identified at 616 include: a static single-handed point gesture, indicating selection of a single word or single image region; a dynamic singled-handed point gesture, indicating selection of multiple words; a static two-handed point gesture, indicating selection of a ROI or a paragraph (e.g., each point gesture indicates a word).

At 618, the indicated content is extracted (e.g., by the content extraction submodule 340) from the content stored in the content database 312, based on the fingertip location(s) associated with the recognized gesture(s). The fingertip location(s) may be mapped to the location of the recognized content stored in the content database 312, in order to extract the content indicated by the recognized gesture(s). As previously mentioned, in some examples content recognition may be performed at the time that a content selection gesture has been recognized (instead of performing content recognition at the time that content change has been detected). In such examples, the indicated content may be extracted by performing content recognition on the portion of the current frame in accordance with the fingertip location(s). For example, the ROI or image portion indicated by two fingertip locations (in the case of a two-handed content selection gesture) may be cropped and content recognition may be performed on the cropped image portion, to extract the content.

The content that is extracted is dependent on the identified content selection gesture. For example, if the identified content selection gesture is a static single-handed point gesture, the content extraction submodule 340 may extract the recognized content (e.g., recognized word, or recognized image) corresponding to the fingertip location associated with the single-handed point gesture. If the identified content selection gesture is a dynamic single-handed point gesture, the content extraction submodule 340 may extract all the words corresponding to the path traversed by the moving fingertip location. If the identified content selection gesture is a static two-handed point gesture, the content extraction submodule 340 may extract the recognized content within the region defined by the two fingertip locations. For example, a first fingertip location may define an upper-left vertex of a rectangular ROI, and a second fingertip location may define a lower-right vertex of the ROI. The extracted content may be a recognized image within the ROI, or the section of text within the ROI.

The extracted content may then be outputted by the content selection module 300 as the selected content. The selected content may be outputted to a software application currently executed by the device 100, such as a reader application, a translation application, etc., which may in turn provide output to the user based on the selected content. For example, if the device 100 is executing a reader application, the reader application may convert the selected content to an audio output (e.g., an audio reading of the selected text, or an audio description of the selected image) to the user. In another example, if the device 100 is executing a translation application, the translation application may translate the selected content to a target language that is visually and/or audibly outputted to the user (e.g., a visual display and/or audio output of a translation of the selected text). In another example, the device 100 may output, on the display 104, a virtual overlay (e.g., overlaid on a real-time image of the current frame) representing the portion of the content that has been selected (e.g., a virtual highlighting of selected text, or a virtual box outlining a selected ROI). Other outputs may be provided by the device 100, depending on how the selected content is used. It should be understood that the selected content may be useful in various applications, and the present disclosure is not limited to any particular application.

Figure 7:
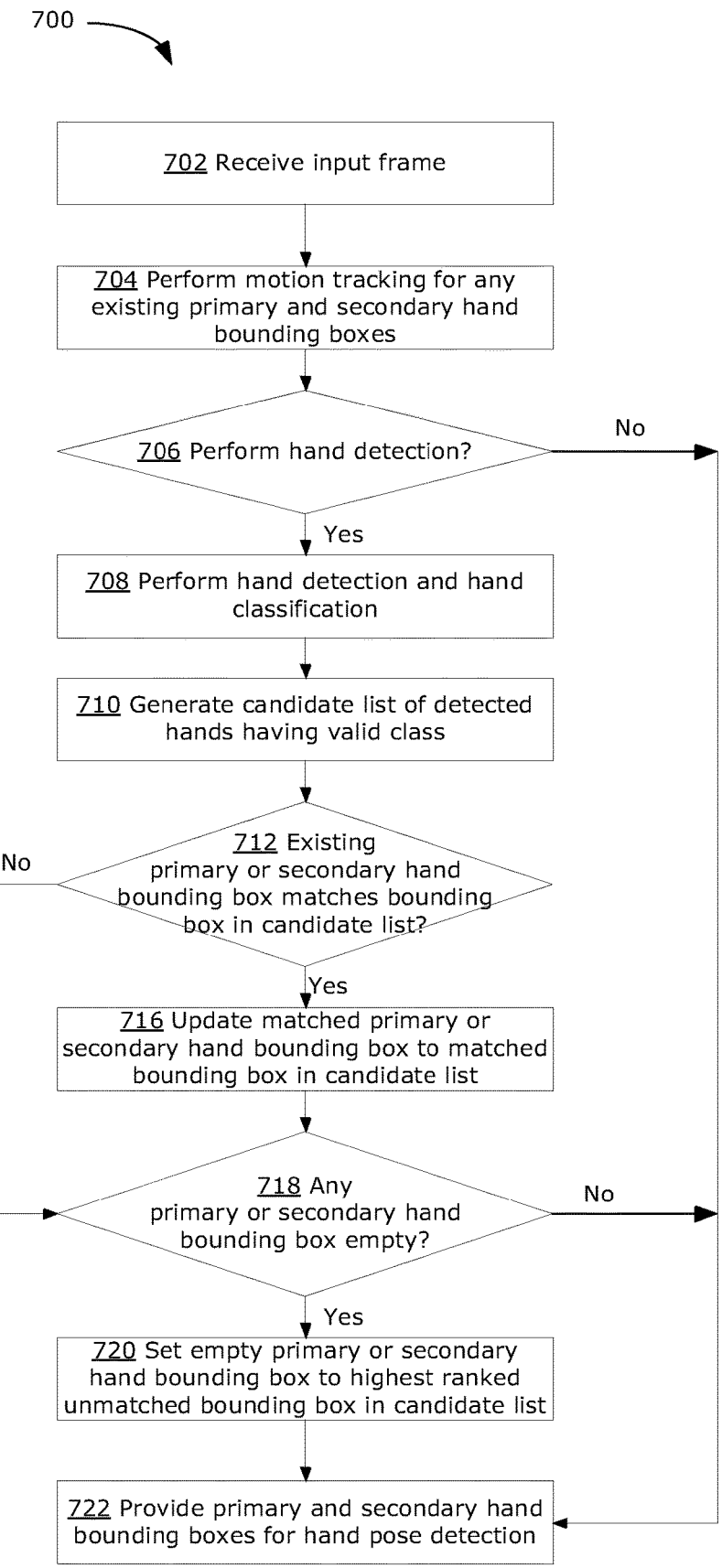
FIG. 7 is a flowchart illustrating an example method for determining bounding boxes for detected hands, in accordance with examples of the present disclosure.

FIG. 7 is a flowchart illustrating an example method 700 that may be implemented for determining one or more hand bounding boxes. The method 700 may be performed by the hand detection submodule 320, for performing step 610 of the method 600, for example. It should be understood that the method 700 discussed below is only exemplary and other methods for determining hand bounding boxes (e.g., other methods that do not use primary and secondary hand bounding boxes) may be used.

In the method 700, reference is made to primary and secondary hand bounding boxes. The primary and secondary hand bounding boxes correspond to up to two detected hands, which are used to detect a content selection gesture. The primary or second hand bounding box are each defined by at least two vertices (e.g., upper-left and lower-right vertices) that define the size and location of the respective primary or secondary hand bounding box in a current frame.

The primary and secondary hand bounding boxes are selected from the hand bounding boxes of all detected hands (e.g., based on ranking of all detected hands). It should be noted that the terms primary and secondary are not intended to connote any relative prioritization or ranking; in general, the primary hand bounding box and the secondary hand bounding box may be interchangeable. The primary and secondary hand bounding boxes are stored, and the primary and secondary hand bounding boxes defined in a previous frame are updated based on processing of a subsequent frame. If a primary or secondary hand bounding box is found to be no longer valid (e.g., there is no match to a hand bounding box of any detected hand for a predefined number of frames), the data stored for that primary or secondary hand bounding box may be discarded. If there is no data stored for the primary hand bounding box or the secondary hand bounding box, that primary hand bounding box or secondary hand bounding box is considered to be empty. Further details are discussed below.

At 702, the input frame is received. Similar to step 602, the input video frame may be received one at a time, in real-time or near real-time. The input frame may be the raw, unprocessed data captured by the camera 102, or may be minimally processed (e.g., normalized).

At 704, if there is any existing primary and/or secondary hand bounding box currently stored (e.g., as a result of hand detection performed in a previous frame), motion tracking is performed (e.g., using any suitable technique, such as the Lucas-Kanade method) to update the location of the primary and/or secondary hand bounding box with the tracked location. It should be noted that motion tracking may be used to update the location of a previously detected hand bounding box, however motion tracking cannot update the size of a hand bounding box and cannot identify a new hand bounding box. If the primary hand bounding box and/or secondary hand bounding box is empty, motion tracking does not generate any data for that primary and/or secondary hand bounding box, and that primary and/or secondary hand bounding box remains empty.

At 706, it is determined whether hand detection should be performed. For example, a speed control parameter can be checked to determine if the current frame is a frame for which hand detection should be performed. In some examples, a binary flag may be set (e.g., by the speed control submodule 350) to indicate whether hand detection should be performed for the current frame, in accordance with the speed control parameter, and the binary flag can be checked to determine if hand detection should be performed.

At 706, if it is determined that hand detection should not be performed, the method 700 proceeds to step 722 to provide the primary and secondary hand bounding boxes (i.e., the primary and secondary hand bounding boxes resulting from motion tracking at step 704) for hand pose detection (it should be noted that, as discussed below with respect to FIG. 8, if hand detection is not performed then hand pose detection is not performed and the fingertip location is updated using motion tracking instead). If a given primary or secondary hand bounding box is empty, then that given primary or secondary hand bounding box may not be provided for hand pose detection, or an empty data structure (e.g., containing a NULL value) is provided corresponding to that given primary or secondary hand bounding box. If both the primary and secondary hand bounding boxes are empty, then instead of providing empty data structures for hand pose detection, hand pose detection (and content extraction) may be omitted for the current frame and the method 700 may return directly to step 702 to process the next input frame.

At 706, if it is determined that hand detection should be performed, the method 700 proceeds to step 708 to perform hand detection and hand classification. At 708, as previously discussed, any suitable hand detection and hand classifier neural networks may be used for hand detection and hand classification. A hand bounding box and associated gesture label (e.g., indicating whether the detected hand is a point gesture, open hand gesture or invalid gesture) is generated for each detected hand.

At 710, a candidate list is generated that includes all hand bounding boxes having a valid class. In this example, only hand bounding boxes that have been assigned a point gesture label or an open hand gesture label are considered to have a valid class. Any hand bounding boxes that are assigned other gesture labels (or for which a gesture label cannot be determined with sufficiently high confidence) are omitted from the candidate list. The candidate list may rank hand bounding boxes according to prominence and/or relevance (e.g., ranked by size, centrality of location, luminosity, classification score, orientation etc.).

At 712, it is determined whether existing primary and/or secondary hand bounding boxes (e.g., after performing motion tracking on a primary and/or secondary bounding box from a previous frame) match any hand bounding box identified in the candidate list. A match may be determined if the intersection of union (IoU) between a given hand bounding box in the candidate list substantially and the primary or secondary hand bounding box is greater than a threshold score (e.g., IoU is equal to or greater than a score of 0.5). Other metrics such as image feature similarity inside the hand bounding boxes may be used instead of the IoU to determine a match. If a primary hand bounding box or secondary hand bounding box is empty, then a match cannot be made for that primary or secondary hand bounding box.

At 712, if no match is found, then the method 700 proceeds to 714 where the existing primary and/or secondary hand bounding box is maintained. After 714, the method 700 proceeds to 718.

At 712, if a match is found, then the method 700 proceeds to 716, where the matched primary or secondary hand bounding box is updated with the matched hand bounding box in the candidate list. This enables the previously-detected hand bounding box to be updated with the most recent hand detection information. In some examples, a binary flag or other indicator may be associated with the matched primary or secondary hand bounding box to indicate that the matched primary or secondary hand bounding box matches a hand bounding box in the candidate list.

At 718, it is determined whether there is any primary or secondary hand bounding box that is empty (e.g., the primary or secondary hand bounding box has a value of NULL or has no data value).

At 718, if there is no primary or secondary hand bounding box that is empty (i.e., both the primary and secondary hand bounding boxes contain valid data), then the method 700 proceeds to step 722 to provide the primary and secondary hand bounding boxes for hand pose detection.

At 718, if a primary hand bounding box or secondary hand bounding box is empty, then the method 700 proceeds to step 720 where the empty primary hand bounding box or empty secondary hand bounding box is set to the highest ranked hand bounding box in the candidate list that is unmatched (i.e., that has not been matched to an existing primary or secondary hand bounding box). If both the primary hand bounding box and the secondary hand bounding box is empty, the primary and secondary hand bounding boxes are set to the highest and second-highest ranked hand bounding boxes in the candidate list (it should be noted that because the primary and secondary hand bounding boxes are interchangeable, the primary and secondary hand bounding boxes may be instead set to the highest and second-highest ranked bounding boxes respectively, or vice versa). If there is an insufficient number of unmatched hand bounding boxes in the candidate list, the primary or secondary hand bounding box may remain empty. That is, if one of the primary or secondary hand bounding boxes is empty and there is at least one unmatched hand bounding box in the candidate list, the empty primary or secondary hand bounding box is set to be the highest ranked unmatched hand bounding box in the candidate list; if there is no unmatched hand bounding box in the candidate list, the empty primary or secondary hand bounding box remains empty. If both the primary and secondary hand bounding boxes are empty and there are at least two hand bounding boxes in the candidate list, the primary and secondary hand bounding boxes are set to the highest and second-highest ranked hand bounding boxes in the candidate list; if there is only one hand bounding box in the candidate list, only the primary hand bounding box is set to the one bounding box in the candidate list, and the secondary hand bounding box remains empty; if there is no hand bounding box in the candidate list, both the primary and secondary hand bounding boxes remain empty.

At 722, the primary and secondary hand bounding boxes are provided for hand pose detection (e.g., outputted to the hand pose detection submodule 330). As previously mentioned, if a given primary or secondary hand bounding box is empty, then that given primary or secondary hand bounding box may not be provided for hand pose detection, or an empty data structure (e.g., containing a NULL value) is provided for that given primary or secondary hand bounding box. If both the primary and secondary hand bounding boxes are empty, then instead of providing empty data structures for hand pose detection, hand pose detection (and content extraction) may be omitted for the current frame and the method 700 may return directly to step 702 to process the next input frame.

The candidate list of hand bounding boxes may also be emptied in preparation for processing the next input frame. In some examples, the candidate list of hand bounding boxes may be used in hand pose detection, in which case the candidate list may be emptied only after hand pose detection has been completed for the current frame.

Figure 8:
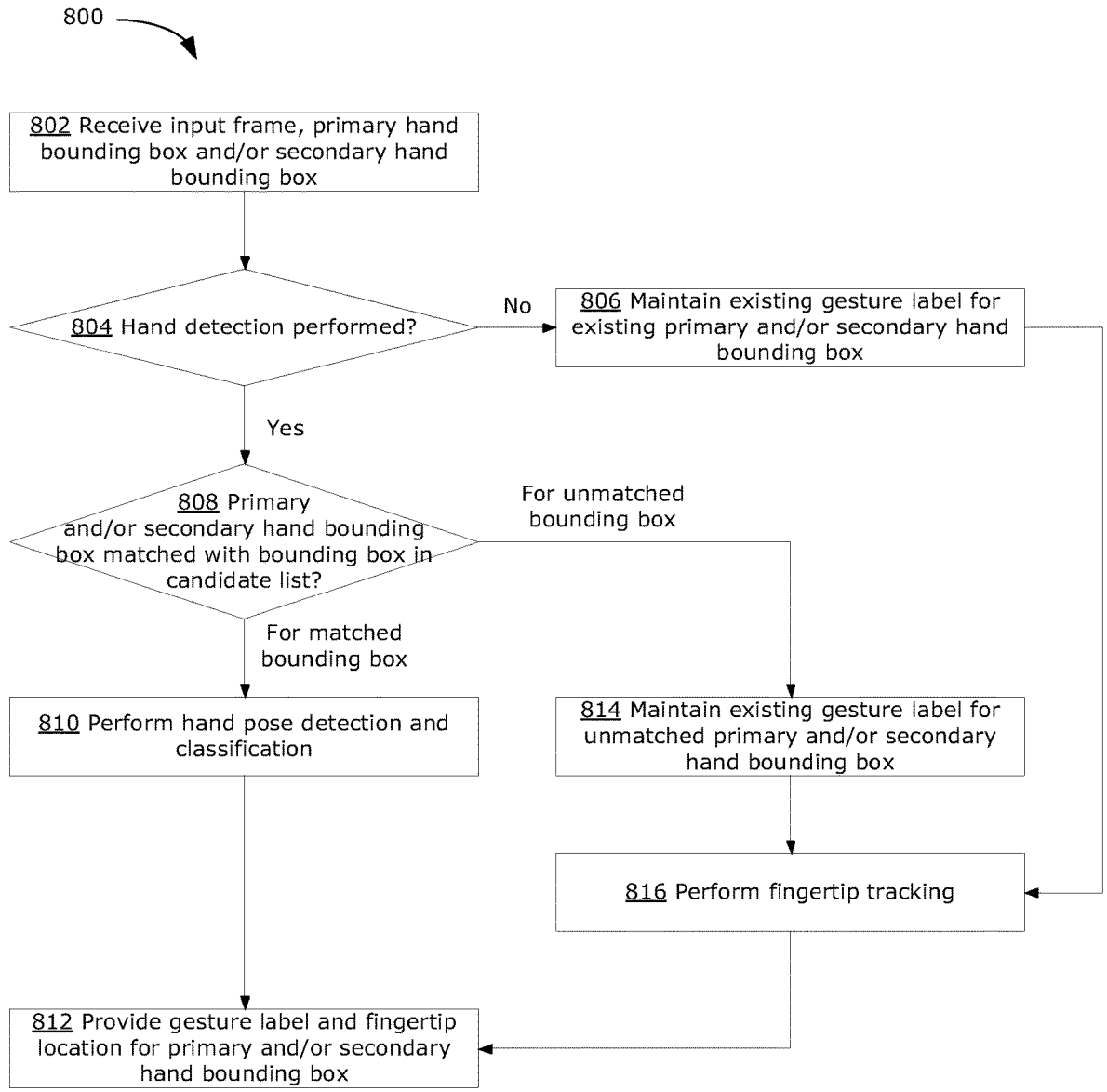
FIG. 8 is a flowchart illustrating an example method for determining gesture label and fingertip location, in accordance with examples of the present disclosure.

FIG. 8 is a flowchart illustrating an example method 800 that may be implemented for determining gesture label and fingertip location. The method 800 may be performed by the hand pose detection submodule 330, for performing step 612 of the method 600, for example. It should be understood that the method 800 discussed below is only exemplary and other methods for determining a gesture label and fingertip location for a detected hand may be used.

At 802, the current input frame is received, as well as the primary and/or secondary hand bounding boxes (e.g., determined using the method 700). In some examples, if a primary or secondary hand bounding box is empty, that primary or secondary hand bounding box may not be provided for hand pose detection. The method 800 has been generalized to enable gesture label and fingertip location determination both in the case where there is data for the primary and secondary hand bounding boxes (e.g., in the case of a two-handed gesture) and in the case where there is data only for one of the primary and secondary hand bounding boxes (e.g., in the case of a single-handed gesture). In some examples, if an empty primary or secondary hand bounding box is provided for hand pose detection, the empty primary or secondary hand bounding box may be ignored and the steps of the method 800 may only be performed for non-empty primary and/or non-empty secondary hand bounding boxes.

At 804, it is determined whether hand detection was performed. For example, a speed control parameter can be checked to determine if the current frame is a frame for which hand detection was performed. In some examples, a binary flag may have been set (e.g., by the speed control submodule 350) to indicate whether hand detection should be performed for the current frame, and the binary flag may be checked to determine whether hand detection was performed.

At 804, if it is determined that hand detection was not performed, the method 800 proceeds to step 806. It should be noted that if hand detection was not performed for the current frame, this means that there are no hand bounding boxes in the candidate list (i.e., candidate list is empty). It should be noted that, if hand detection was not performed for the current frame, then any existing primary and/or secondary hand bounding box is the result of hand detection having been performed in a previous frame. As well, hand pose detection and classification would have been performed for that previous frame. Accordingly, any existing primary and/or secondary hand bounding box would already have an associated gesture label and fingertip bounding box. If hand detection was not performed for the current frame, it may be assumed that the previously determined gesture label is still valid. Thus, at step 806, the existing gesture label associated with the existing primary and/or secondary hand bounding box is maintained. The primary and/or secondary hand bounding box is updated by motion tracking. Following step 806, the method 800 proceeds to step 816, discussed further below.

At 804, if it is determined that hand detection was performed, this means that there may be hand bounding boxes in the candidate list. The method 800 proceeds to step 808, where it is determined whether the primary and/or secondary hand bounding boxes matched a respective hand bounding box in the candidate list (e.g., by checking a binary flag or other indicator associated with the primary and/or secondary hand bounding boxes).

If a primary or secondary hand bounding box was matched with a hand bounding box in the candidate list, the method 800 proceeds to step 810. If a primary or secondary hand bounding box was matched with a hand bounding box in the candidate list, this means that the primary or secondary hand bounding box corresponds to a detected hand in the current frame.

At 810, hand pose detection and classification is performed for the matched primary or secondary hand bounding box. If both the primary and secondary hand bounding boxes match with a respective hand bounding box in the candidate list, step 810 may be performed for both the primary and secondary hand bounding boxes. In some examples, hand pose detection and classification may be performed by a joint hand pose detection and classification neural network, as discussed further below. The hand pose detection and classification generates a gesture label and a fingertip location for the matched primary or secondary hand bounding box. In addition to the fingertip location, a fingertip bounding box is also determined. The fingertip bounding box may be used for motion tracking of a fingertip in subsequent frames where hand detection is not performed.

At 812, the determined gesture label and fingertip location is provided for each non-empty primary and/or secondary hand bounding box. The gesture label(s) and fingertip location(s) are used to identify the content selection gesture and extract the selected content, as discussed previously.

Returning to step 808, if it is determined that there is a primary or secondary hand bounding box that is unmatched with a hand bounding box in the candidate list (i.e., a primary or secondary hand bounding box determined from a previous frame is not detected in a current frame), the method 800 proceeds to step 814. It may be assumed that, although the primary or secondary hand bounding box does not match a hand bounding box of a detected hand in the current frame, the previously determined gesture label for the primary or secondary hand bounding box is still valid (e.g., a previously detected hand is just obscured in the current frame). Accordingly, at step 814, the existing gesture label for the unmatched primary or secondary hand bounding box is maintained. The primary or secondary hand bounding box is updated by motion tracking.

At 816, fingertip tracking is performed to update the location of the fingertip bounding box. For example, a motion tracking technique (e.g., any suitable optical flow technique) may be performed to update the location of the previously determined fingertip bounding box, and to determine the location of a fingertip within the fingertip bounding box. The method 800 may then proceed to step 812 to provide the gesture label and fingertip location for the primary or secondary hand bounding box.

In some examples, during the method 700 and/or the method 800, if an existing primary or secondary hand bounding box cannot be matched with a detected hand bounding box in the candidate list for a predefined number of frames (e.g., no match found for more than 10 frames, or for more than 20 frames), then it may be assumed that the existing primary or secondary hand bounding box is no longer valid (e.g., the previously detected hand has moved out of the FOV) and should be set to empty.

An example joint hand pose detection and classification neural network is now discussed. The joint hand pose detection and classification neural network discussed below may be used for hand pose detection and classification in the methods disclosed herein. However, examples of the present disclosure may be implemented using other neural network architectures for hand pose detection and classification, including using one neural network for hand pose detection and a separate neural network for hand pose classification.

Figure 9:
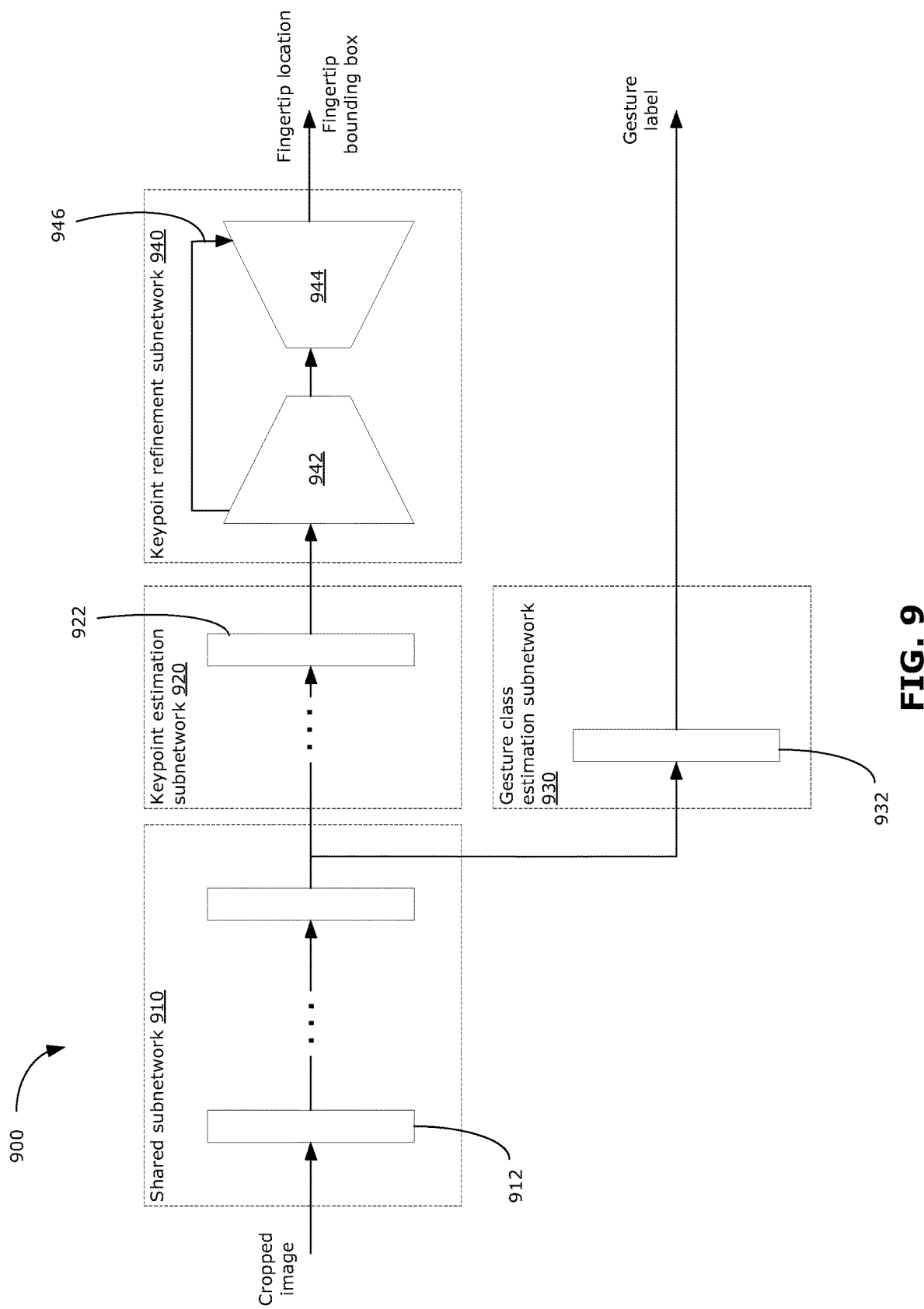
FIG. 9 is a block diagram illustrating an example joint hand pose detection and classification neural network, in accordance with examples of the present disclosure.

FIG. 9 is a block diagram illustrating an architecture of an example joint hand pose detection and classification neural network 900. The joint hand pose detection and classification neural network 900 may be used by the hand pose detection submodule 330 to estimate the gesture label and fingertip location of a detected hand, for example.

Instead of requiring separate neural networks separately trained for hand pose detection, hand pose refinement, and gesture classification tasks, a single unified joint hand pose detection and classification neural network 900 may be used. The joint hand pose detection and classification neural network 900 includes a shared subnetwork 910, a keypoint estimation subnetwork 920, a gesture class estimation subnetwork 930, and a keypoint refinement subnetwork 940. Input to the joint hand pose detection and classification neural network 900 is a cropped image, which is the result of cropping the input frame to the hand bounding box of a detected hand (e.g., the primary hand bounding box or the secondary hand bounding box). If there are two hand bounding boxes (e.g., both the primary and secondary hand bounding boxes) corresponding to two detected hands in the frame, then the two cropped images may be separately processed by the joint hand pose detection and classification neural network 900.

The shared subnetwork 910 includes a plurality of convolutional layers 912. The cropped image is inputted to the shared subnetwork 910, which encodes the cropped image into a feature representation (e.g., a feature matrix). In an example, the shared subnetwork 910 may include parallel multi-resolution branches, such as in the architecture of HRNet (e.g., described by Sun et al. "Deep high resolution representation learning for human pose estimation", *CVPR*, 2019). However, any architecture that is suitable for image feature extraction (particularly for pose estimation) may be used for the shared subnetwork 910.

The output from the shared subnetwork 910 is coupled to both the keypoint estimation subnetwork 920 and the gesture class estimation subnetwork 930. In this example, the keypoint estimation subnetwork 920 includes at least one keypoint output layer 922 that is trained specifically for the keypoint estimation task. The keypoint estimation subnetwork 920 may also include one or more other inner layers (not shown). For example, the keypoint estimation subnetwork 920 may be based on the architecture of output layer of HRNet. The keypoint estimation subnetwork 920 outputs a set of estimated keypoints for the detected hand within the cropped image. The set of estimated keypoints include at least one keypoint corresponding to the longest extended finger (i.e., the fingertip location), as well as a fingertip bounding box. The set of estimated keypoints may be a set of 21 keypoints (corresponding to the key 21 joints of the hand) or may be a set of two keypoints (one keypoint corresponding to the palm and one keypoint corresponding to the longest extended finger), for example.

The gesture class estimation subnetwork 930 includes at least a class output layer 932 (e.g., a fully connected layer) that is trained specifically for the gesture class estimation task. The gesture class estimation subnetwork 930 may also include one or more other inner layers (not shown). For example, the gesture class estimation subnetwork 930 may have an architecture of several fully connected layers and a softmax layer, which outputs a confidence score for each gesture label. The output from the gesture class estimation subnetwork 930 is a gesture label with the maximal score representing the estimated gesture (e.g., open hand gesture or point gesture) of the detected hand within the cropped image.

In this example, the output from the keypoint estimation subnetwork 920 is further coupled to the keypoint refinement subnetwork 940, which further refines the estimated keypoints (including the fingertip location and fingertip bounding box). In other examples the keypoint refinement subnetwork 940 may not be included in the joint hand pose detection and classification neural network 900, and the fingertip location and fingertip bounding box outputted by the joint hand pose detection and classification neural network 900 may be the output from the keypoint estimation subnetwork 920. In the example shown, the keypoint refinement subnetwork 940 has an autoencoder architecture, including an encoder 942 and a decoder 944. One or more short connections 946 (also referred to as skip connections) may be used to provide a direct path to copy output from inner layer(s) of the encoder 942 to corresponding layer(s) of the decoder 944 (i.e., layer(s) of the decoder 944 having a corresponding resolution to the copied layer(s) of the encoder 945). For example, the keypoint refinement subnetwork 940 may have short connections similar to that of U-net (e.g., described by Ronneberger et al., "U-net: Convolutional networks for biomedical image segmentation" *International conference on medical image computing and computer-assisted intervention,* 2015).

The output of the joint hand pose detection and classification neural network 900 is the gesture label outputted by the gesture class estimation subnetwork 930, and the fingertip location and fingertip bounding box outputted by the keypoint refinement subnetwork 940 (or outputted by the keypoint estimation subnetwork 920 if the keypoint refinement subnetwork 940 is omitted).

The use of the joint hand pose detection and classification neural network 900, instead of separate neural networks for hand pose detection and hand pose classification, may be useful for implementation in devices having limited computing resources (e.g., limited processing power, memory resources and/or battery power).

As previously discussed with respect to FIG. 6, a content selection gesture (e.g., a single-handed point gesture, or a two-handed point gesture) may be detected only when a fingertip is determined to be touching the selected content (e.g., the depth of the fingertip and the depth of the content surface are within a depth margin of each other). In some examples, the device 100 may include a depth sensor 106, such as a time-of-flight (TOF) sensor, to sense depth information. In some examples, the depth sensor 106 and the optical camera 102 may be integrated into a single unit (which may be referred to as a 3D camera or a depth camera). If the depth sensor 106 is used to detect the depth of a fingertip, a point gesture may be considered to be a content selection gesture when the depth of the fingertip is at or close to the depth of the content surface (e.g., the surface of a page), without requiring the fingertip to maintain a substantially unchanged location for a predefined period of time.

Figure 10:
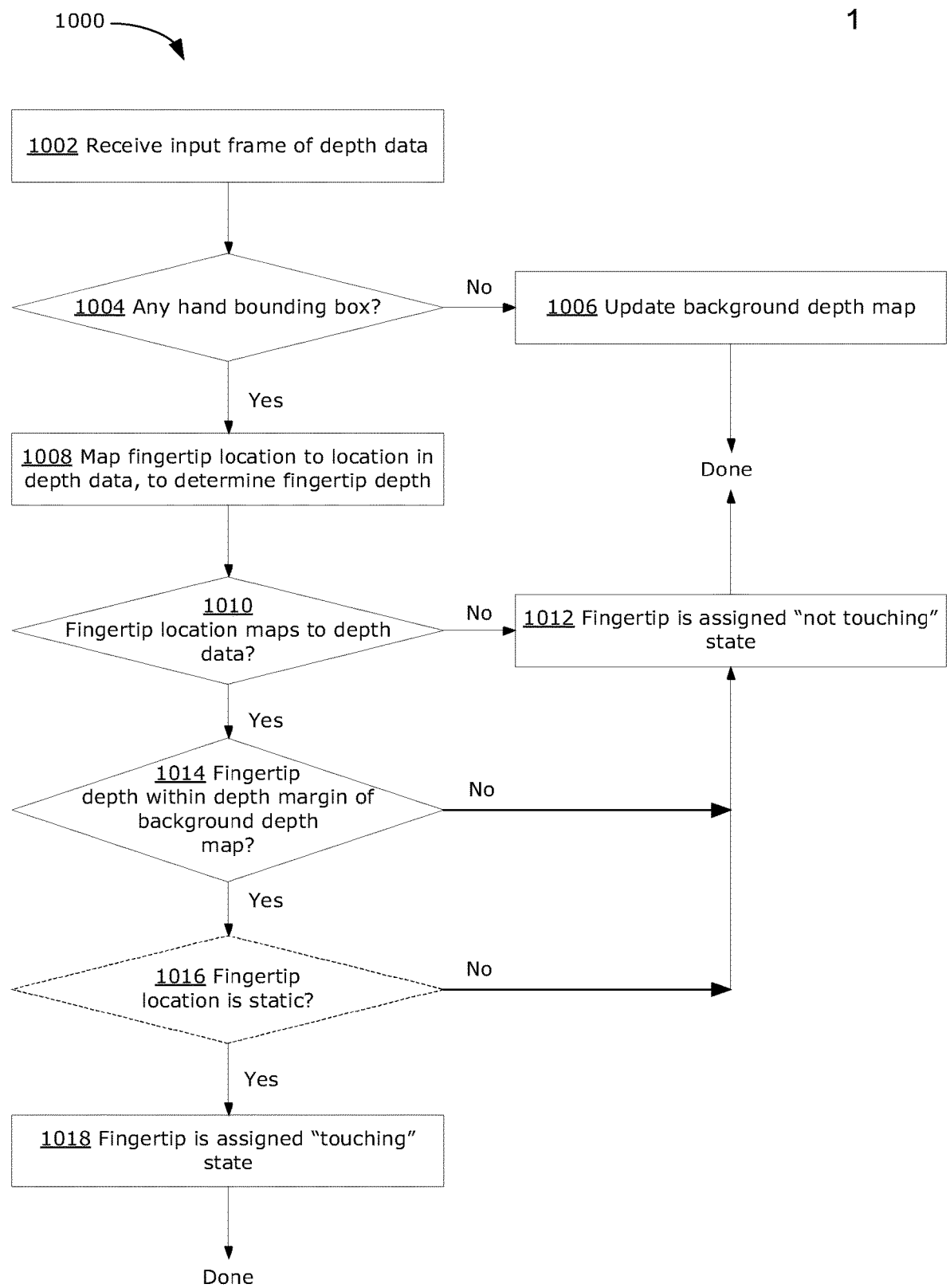
FIG. 10 is a flowchart illustrating an example method for determining a touch state using depth data, in accordance with examples of the present disclosure.

FIG. 10 is a flowchart illustrating an example method 1000 that may be implemented for detecting whether a fingertip is touching a content surface. In particular, the method 1000 may determine a touch state associated with a fingertip of a detected hand, where the touch state is either "touching" (where the fingertip is considered to be touching the content surface) or "not touching" (where the fingertip is considered to be not touching the content surface). The method 1000 may be performed by the hand pose detection submodule 330, for performing step 614 of the method 600, for example. In some examples, the method 1000 may be performed by a depth submodule (not shown) of the content selection module 300, instead of being performed by the hand pose detection submodule 330. It should be understood that the method 1000 discussed below is only exemplary and other methods for determining whether a fingertip is touching a content surface may be used.

At 1002, an input frame of depth data is received. The frame of depth data may be a 2D depth map of depth values sensed by the depth sensor 106 over a FOV of the depth sensor 106. The frame of depth data may be a frame of real-time or near real-time depth data generated by the depth sensor 106. It should be noted that the FOV of the depth sensor 106 may not be the same as the FOV of the camera 102, however the FOV of the depth sensor 106 and the FOV of the camera 102 should significantly overlap (e.g., at least 80% of the FOV of the camera 102 should be overlapped by the FOV of the depth sensor 106, or vice versa). If a fingertip has been detected, the fingertip location may also be received.

At 1004, it is determined whether there is any hand bounding box currently (e.g., any primary or secondary hand bounding box) existing. If there is no hand bounding box that currently exists, this indicates that there is no hand within the FOV of the camera 102, and it may be assumed that there is also no hand within the FOV of the depth sensor 106.

If there is no hand bounding box, the method 1000 proceeds to 1006. At 1006, a background depth map is updated. The background depth map may be updated by computing a statistical model of the depth data when no hand is detected. In general, when there is no hand bounding box, it may be assumed that the frame of depth data captures the background depth (e.g., including the depth of the content surface, such as a page, as well as any other background, such as a table), and the depth data thus can be used as the background depth map. The background depth map may be updated statistically over multiple frames of depth data (e.g., by averaging the depth data for each point in the depth map, over a predefined moving window of depth data). By computing a statistical model as the background depth map, any noise may be smoothed out. The background depth map may be stored in a temporary buffer or cache. It should be noted that the background depth map may be updated using any frame of depth data when there is no hand bounding box (i.e., no hand is detected). To ensure the background depth map is up to date, a sliding window may be used such that the background depth map is built using only a predefined number (e.g., 5 or 10) of the most recent frames of depth data. After updating the background depth map, the method 1000 may be done (until the next frame of depth data is received).

Returning to 1004, if there is at least one hand bounding box, the method 1000 proceeds to 1008. At 1008, the fingertip location (associated with each of the primary and/or secondary hand bounding box) is mapped to a corresponding location in the frame of depth data, to determine the fingertip depth.

The mapping operation is performed to map the location of the fingertip, which is defined with reference to the frame of video data captured by the camera 102, to the corresponding location in the frame of depth data captured by the depth sensor 106. As previously noted, the FOV of the camera 102 and the FOV of the depth sensor 106 may not be identical, hence the fingertip location that is detected based on the frame of video data may not match the location of the fingertip in the depth data. A rigid transformation (e.g., defined by a predefined transformation matrix) may be used to map the detected fingertip location to the depth data, where the rigid transformation may be determined from a precalibration of the device 100 (e.g., at a factory calibration). For example, a commonly used checkerboard calibration method may be performed to estimate the rotation, translation and camera characteristics (also referred to as intrinsic and extrinsic parameters) to determine the transformation for mapping the video data to the depth data (and vice versa).

At 1010, it is determined whether the fingertip location maps to a valid value in the depth data. Because the FOV of the camera 102 and the FOV of the depth sensor 106 may not be identical, it is possible that the fingertip location maps to a location that is outside the boundary of the depth data (i.e., outside the FOV of the depth sensor 106). In such a case, the fingertip location is considered to not map to the depth data. If the fingertip location does not map to the depth data, the method 1000 proceeds to 1012.

At 1012, the fingertip is assigned a "not touching" state (i.e., the fingertip is considered to be not touching the content surface), and the method 1000 may be done (until the next frame of depth data is received).

Returning to 1010, if the fingertip location maps to a valid value in the depth data, the method 1000 proceeds to step 1014. At 1014, it is determined whether the fingertip depth is within a depth margin of the corresponding location in the background depth map. Specifically, the fingertip depth is determined from the current frame of depth data, based on the mapped fingertip location (i.e., the location in the depth data that has been mapped from the fingertip location at 1008). Then, the background depth at the mapped fingertip location is determined using the background depth map. If the fingertip depth and the background depth are outside of a predetermined depth margin of each other (e.g., the absolute value of the difference between the fingertip depth and the background depth is greater than the predetermined depth margin), then the method 1000 proceeds to 1012, where the fingertip is assigned the "not touching" state.

If the fingertip depth and the background depth are within the predetermined depth margin of each other (e.g., the absolute value of the difference between the fingertip depth and the background depth is equal to or less than the predetermined depth margin), then the method 1000 proceeds to optional step 1016.

In some examples, the predetermined depth margin used at 1014 may be defined using a hysteresis function. For example, the predetermined depth margin may be a first smaller depth margin if the fingertip was previously (e.g., in a previous frame of depth data) assigned the "not touching" state, and may be a second larger depth margin if the fingertip was previously (e.g., in a previous frame of depth data) assigned the "touching" state. The use of a hysteresis function to define the depth margin may help to reduce excessive flip-flopping between the different touch states for the fingertip of the detected hand.

Optionally, at 1016, it may be determined whether the fingertip location is static. For example, it may be determined whether the fingertip location is substantially unchanged (e.g., does not change more than within a defined margin of error) for a predetermined number of frames of video data (e.g., 10 or 20 frames). If the fingertip location is not static, then the method 1000 proceeds to 1012, where the fingertip is assigned the "not touching" state. If the fingertip location is static, the method 1000 proceeds to 1018.

At 1018, the fingertip is assigned the "touching" state (i.e., the fingertip is considered to be touching the content surface), and the method 1000 may be done (until the next frame of depth data is received).

Using the method 1000, the device 100 may determine that the fingertip is touching the content surface. The device 100 may detect a content selection gesture only if there is both a gesture label representing a point gesture for a detected hand bounding box as well as a "touching" state for the associated fingertip location. This may mimic a user's typical interaction with a touchscreen, and may also help to avoid false positives. The use of depth data to determine whether the fingertip is touching the content surface may enable detection of a content selection gesture without requiring the user's fingertip to hold a location for a defined number of frames. Even if the fingertip location is required to be static (e.g., determined at step 1016) in order for a "touching" state to be determined, the number of frames for which the location is required to be static may be reduced.

The methods and devices described above enables real-time detection and recognition of single-handed and two-handed gestures, which supports machine vision-based selection of content. The ability to detect and recognize two-handed gestures for content selection enables more accurate selection of more complex content, such as selection of a ROI or a paragraph of text. Further, by performing content recognition and storing recognized content ahead of detection of a content selection gesture, the problem of the user's hand obscuring the content is avoided.

In some examples, a speed control parameter is used to enable dynamic control of whether to perform hand detection (e.g., based on whether a content selection gesture, such as a point gesture, has been recognized). This may enable more efficient use of computer resources, with a balance between accuracy of gesture detection and use of computing resources.

In some examples, a joint hand pose detection and classification neural network described herein may be used for generate a gesture label and fingertip location for a detected hand.

The disclosed methods and systems may be implemented using various machine vision-capable devices, including devices that may have limited computing resources (e.g., limited processing power, limited memory resources, limited battery power, etc.), including smartphones, tablets, laptops, smart light devices, smart speaker devices, reader devices, among others.

In various examples, the present disclosure describes systems and methods to help improve the operation of machine vision-capable devices. The present disclosure enables such devices to detect and process a content selection gesture using machine vision-based techniques. The disclosed methods and systems may replace or supplement existing touch-based gestures for content selection.

Although examples have been described in the context of a machine vision-capable device having a display and a camera (such as a smartphone, a smart reader, a smart light, or a tablet), the present disclosure may be relevant to other machine vision-capable devices that may or may not include a display. For example, the present disclosure may be relevant to smart speakers or other computing devices that may benefit from gesture-based content selection.

Examples described herein may be applicable to artificial reality (AR), virtual reality (VR) and/or video gaming applications. Examples described herein may also be implemented in the context of a smart car, a smart television, or a smart home, among other possibilities.

Although examples have been described in the context of using point gestures as user input for content selection, it should be understood that gestures that include handheld instruments (e.g., stylus, pointer instrument, pen, etc.) may also be recognized as a point gesture, where the location of the distal tip of the instrument (e.g., distal point of a stylus, pointer instrument, pen, etc.) is used as the fingertip location for identifying the selected content.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for content selection, the method comprising:
in at least one prior frame of video data, determining there is a content change, obtaining content data recognized from non-digital visual content captured in the at least one prior frame of video data and storing the content data;
detecting one or more hands in an obtained current frame of video data;
determining a respective fingertip location associated with each of up to two detected hands of the detected one or more hands;
identifying a content selection gesture corresponding to the up to two detected hands; and
extracting selected content data corresponding to selected non-digital visual content in the current frame of video data indicated by the content selection gesture, wherein extracting the selected content data comprises extracting the selected content data from the stored content data, wherein indication of the selected non-digital visual content is further based on the respective up to two fingertip locations.

2. The method of claim 1, wherein detecting the respective fingertip location associated with each of the up to two detected hands comprises:
using hand bounding boxes corresponding to the up to two detected hands, performing hand classification and hand pose detection to determine the respective fingertip location associated with each of the up to two detected hands.

3. The method of claim 2, wherein hand classification and hand pose detection is performed to also determine a respective gesture label with each of the up to two detected hands, and wherein the content selection gesture is identified based on the respective up to two gesture labels.

4. The method of claim 3, wherein each of the up to two gesture labels represents a gesture class selected from: a point gesture, or an open hand gesture.

5. The method of claim 1, wherein extracting the selected content data corresponding to the selected non-digital visual content further comprises extracting a portion of the current frame of video data indicated by the content selection gesture and performing visual content recognition in the portion of the current frame of video data.

6. The method of claim 1, wherein determining the content change comprises:
determining a difference between a statistical characteristic of the at least one prior frame of video data and another frame of video data captured prior to the at least one prior frame, wherein the determined difference is greater than a preset threshold.

7. The method of claim 1, wherein determining the content change comprises:
detecting a hand in the at least one prior frame of video data; and
identifying a content change gesture, corresponding to the detected hand in the at least one prior frame of video data, indicating the content change.

8. The method of claim 1, further comprising:
determining, from an obtained current frame of depth data, for each fingertip location associated with each of the up to two detected hands, whether the respective fingertip location is associated with a first touch state; and
determining the content selection gesture when the respective fingertip location is considered to have the first touch state.

9. The method of claim 8, wherein the respective fingertip location is determined to be associated with the first touch state when a respective fingertip depth associated with the fingertip location is within a predetermined depth margin of a background depth map.

10. The method of claim 1, further comprising:
providing an output based on the selected content data;
wherein the output comprises:
a translation of text included in the selected content data;
an audio reading of text included in the selected content data; or
a virtual overlay indicating the selected content data.

11. A device comprising:
a processing unit coupled to a memory storing machine-executable instructions thereon, wherein the instructions, when executed by the processing device, cause the device to:
in at least one prior frame of video data, determine there is a content change, obtain content data recognized from non-digital visual content captured in the at least one prior frame of video data and store the content data;
detect one or more hands in an obtained current frame of video data;
determine a respective fingertip location associated with each of up to two detected hands of the detected one or more hands;
identify a content selection gesture corresponding to the up to two detected hands; and
extract selected content data corresponding to selected non-digital visual content in the current frame of video data indicated by the content selection gesture, wherein extracting the selected content data comprises extracting the selected content data from the stored content data, wherein indication of the selected non-digital visual content is further based on the respective up to two fingertip locations.

12. The device of claim 11, wherein the instructions cause the device to detect the respective fingertip location associated with each of the up to two detected hands by:
using hand bounding boxes corresponding to the up to two detected hands, performing hand classification and hand pose detection to determine the respective fingertip location associated with each of the up to two detected hands.

13. The device of claim 12, wherein hand classification and hand pose detection is performed to also determine a respective gesture label with each of the up to two detected hands, and wherein the content selection gesture is identified based on the respective up to two gesture labels.

14. The device of claim 13, wherein each of the up to two gesture labels represents a gesture class selected from: a point gesture, or an open hand gesture.

15. The device of claim 11, wherein the instructions cause the device to determine the content change by:
determining a difference between a statistical characteristic of the at least one prior frame of video data and another frame of video data captured prior to the at least one prior frame, wherein the determined difference is greater than a preset threshold.

16. The device of claim 11, wherein the instructions cause the device to determine the content change by:
detecting a hand in the at least one prior frame of video data; and
identifying a content change gesture, corresponding to the detected hand in the at least one prior frame of video data, indicating the content change.

17. The device of claim 11, wherein the instructions further cause the device to:
determine, from an obtained current frame of depth data, for each fingertip location associated with each of the up to two detected hands, whether the respective fingertip location is associated with a first touch state; and
determine the content selection gesture when the respective fingertip location is considered to have the first touch state.

18. A non-transitory computer-readable medium having machine-executable instructions stored thereon, the instructions, when executed by a processing unit of a device, cause the device to:
in at least one prior frame of video data, determine there is a content change, obtain content data recognized from non-digital visual content captured in the at least one prior frame of video data and store the content data;
detect one or more hands in an obtained current frame of video data;
determine a respective fingertip location associated with each of up to two detected hands of the detected one or more hands;
identify a content selection gesture corresponding to the up to two detected hands; and
extract selected content data corresponding to selected non-digital visual content indicated in the current frame of video data by the content selection gesture, wherein extracting the selected content data comprises extracting the selected content data from the stored content data, wherein indication of the selected non-digital visual content is further based on the respective up to two fingertip locations.

19. The non-transitory computer-readable medium of claim 18, wherein the instructions cause the device to determine the content change by:
determining a difference between a statistical characteristic of the at least one prior frame of video data and another frame of video data captured prior to the at least one prior frame, wherein the determined difference is greater than a preset threshold.

20. The non-transitory computer-readable medium of claim 18, wherein the instructions cause the device to determine the content change by:
detecting a hand in the at least one prior frame of video data; and
identifying a content change gesture, corresponding to the detected hand in the at least one prior frame of video data, indicating the content change.

* * * * *